United States Patent [19]
Yamaguchi

[11] Patent Number: 6,133,566
[45] Date of Patent: Oct. 17, 2000

[54] MULTIPLE BEAM SCANNING APPARATUS AND LIGHT SOURCE UNIT THEREFOR

[75] Inventor: Katsumi Yamaguchi, Kawasaki, Japan

[73] Assignee: Ricoh Company, Ltd., Tokyo, Japan

[21] Appl. No.: 09/151,029

[22] Filed: Sep. 10, 1998

[30] Foreign Application Priority Data

Sep. 10, 1997 [JP] Japan ..................................... 9-244903

[51] Int. Cl.$^7$ ..................................................... H01J 3/14
[52] U.S. Cl. .......................... 250/234; 250/236; 359/204
[58] Field of Search .................................. 250/234, 235, 250/236, 205; 359/204, 205, 216; 347/256–261

[56] References Cited

U.S. PATENT DOCUMENTS

| | | |
|---|---|---|
| 4,955,682 | 9/1990 | Yamaguchi et al. . |
| 5,005,928 | 4/1991 | Suzuki et al. . |
| 5,155,616 | 10/1992 | Yamaguchi et al. ..................... 359/216 |
| 5,233,455 | 8/1993 | Yamaguchi et al. ..................... 359/205 |
| 5,604,622 | 2/1997 | Iizuka et al. ............................. 359/207 |

*Primary Examiner*—Que T. Le
*Attorney, Agent, or Firm*—Oblon, Spivak, McClelland, Maier & Neustadt, P.C.

[57] ABSTRACT

A multiple beam scanning apparatus and a light source unit employed in the multiple beam scanning apparatus and a method of multiple beam scanning. A multiple beam scanning apparatus is realized which utilizes a multiple beam system in which four or more light beams are employed with comparatively low cost without making a light source unit, deflection medium, focusing optical system, etc. large sized. The light source unit employed in the multiple beam scanning apparatus includes m (m≧2) pieces of semiconductor laser arrays respectively having n (n≧2) light-emitting points. A multiple beam system is realized utilizing n-times multiple beams without making the light source unit large sized. Furthermore, another multiple beam system is realized utilizing m-times multiple beams and enabling making such a multiple beam system on further profitable conditions.

29 Claims, 18 Drawing Sheets

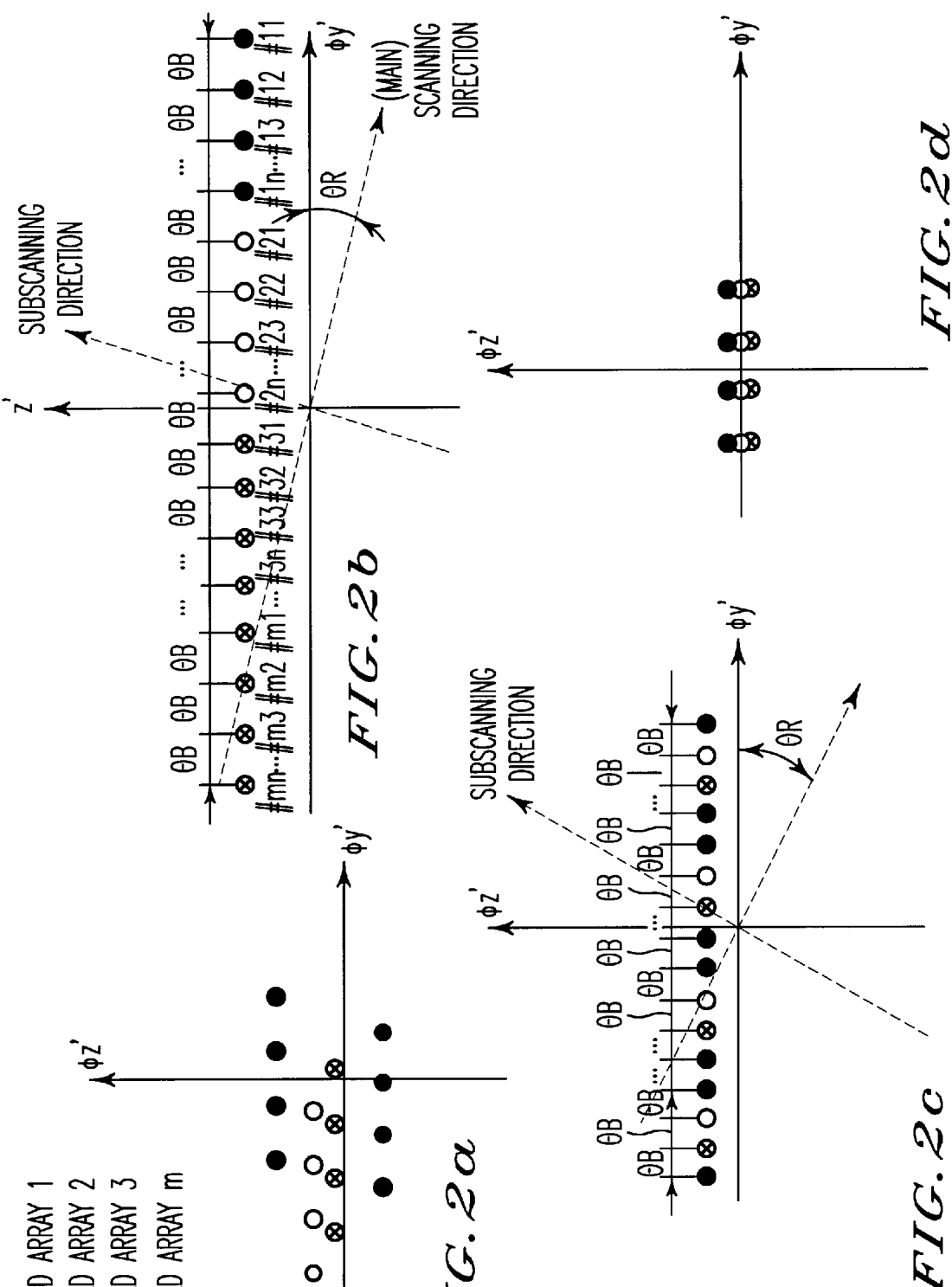

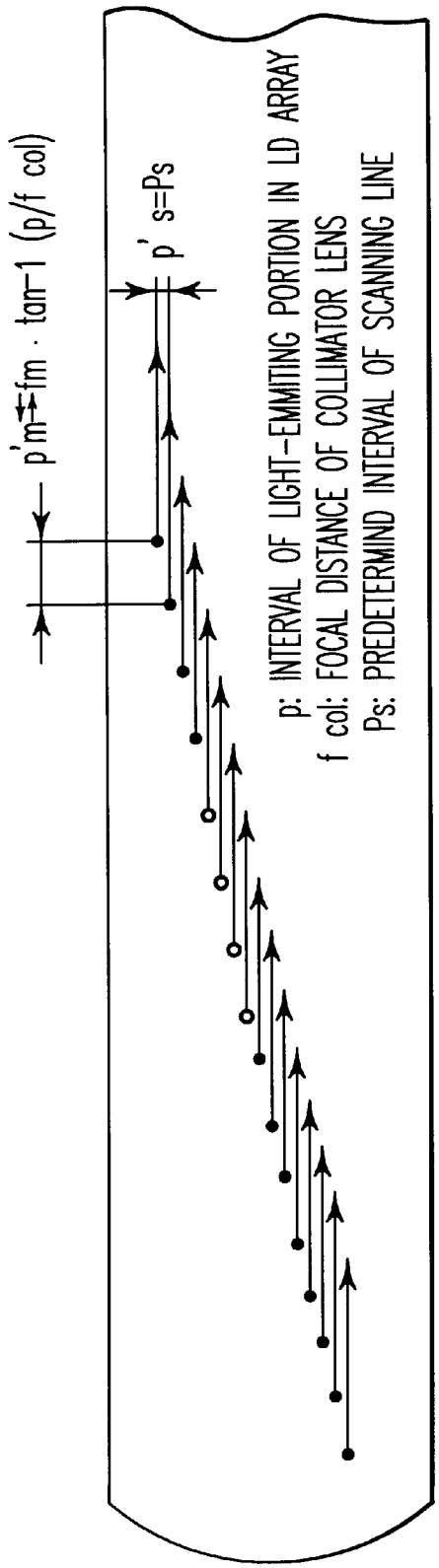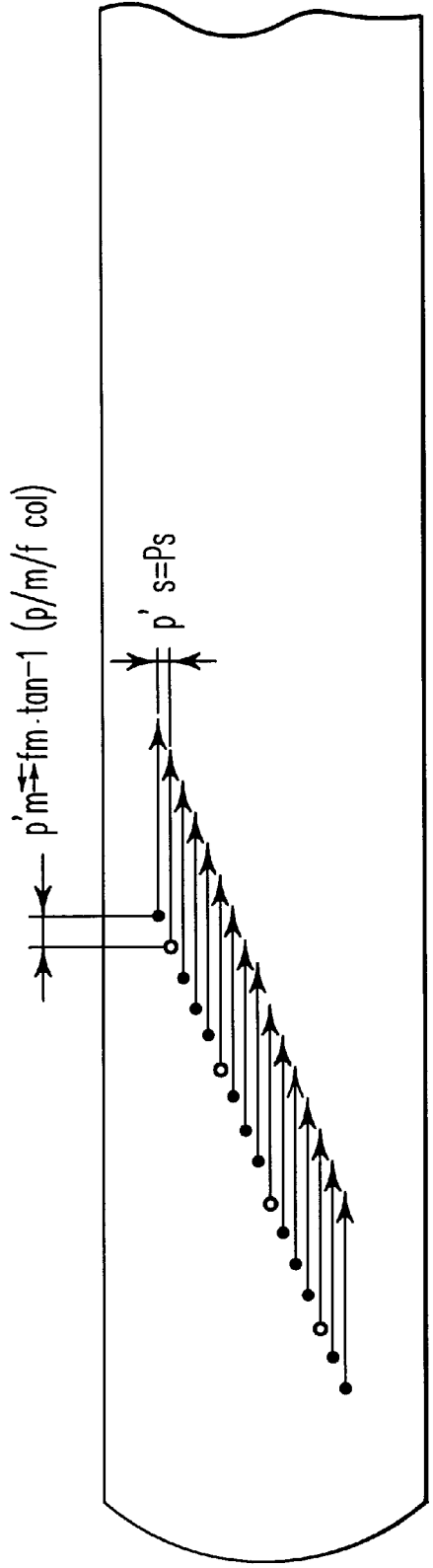
FIG. 3a
FIG. 3b
p: INTERVAL OF LIGHT-EMITTING PORTION IN LD ARRAY
f col: FOCAL DISTANCE OF COLLIMATOR LENS
Ps: PREDETERMIND INTERVAL OF SCANNING LINE

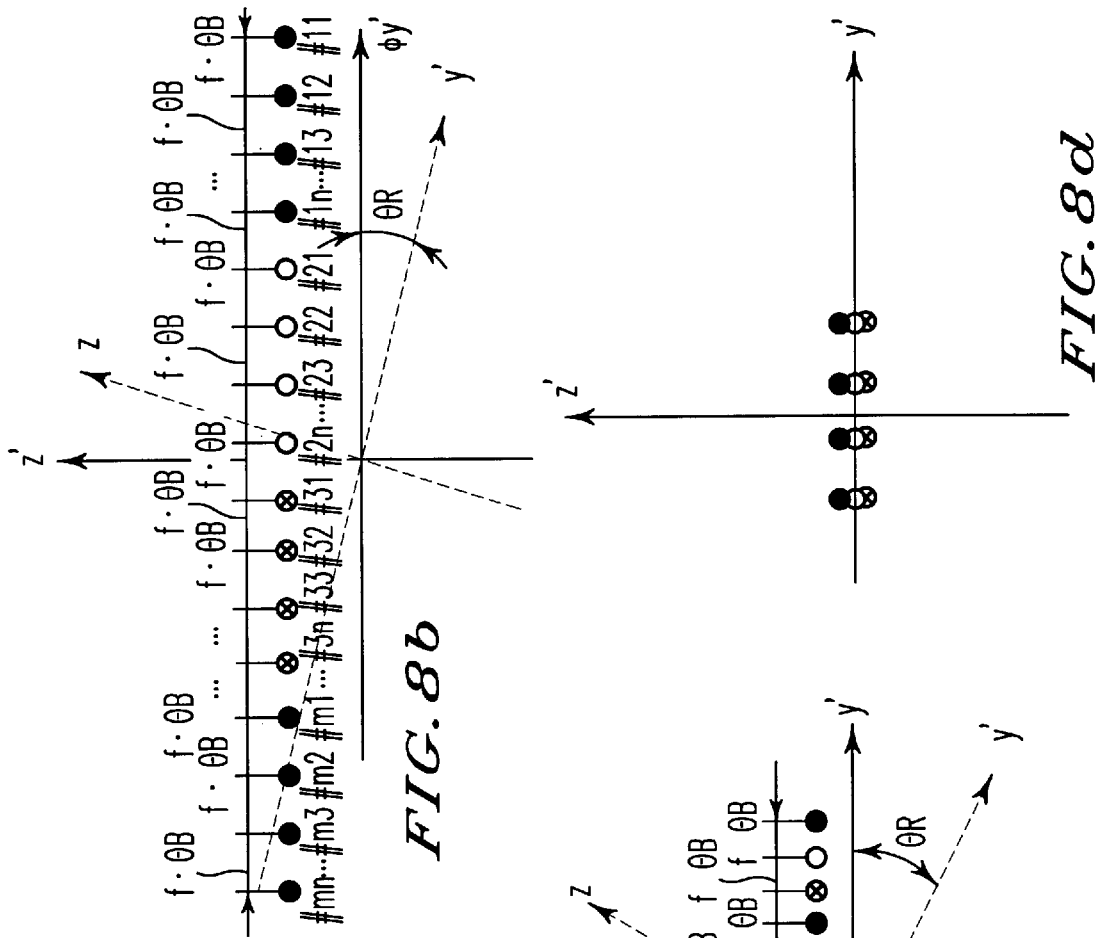
*FIG.8b*
*FIG.8d*
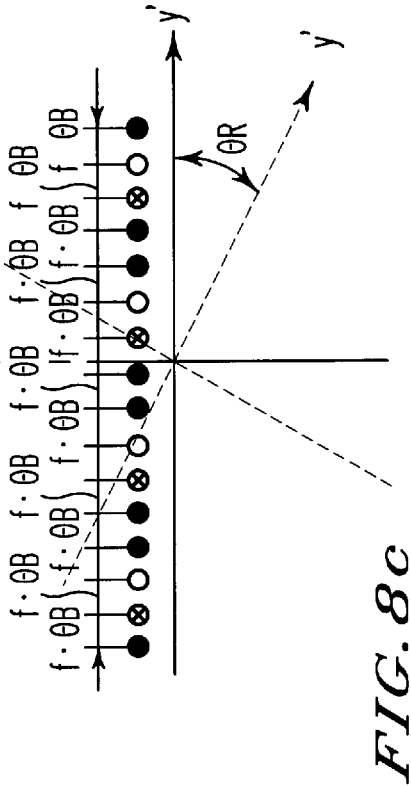
*FIG.8c*
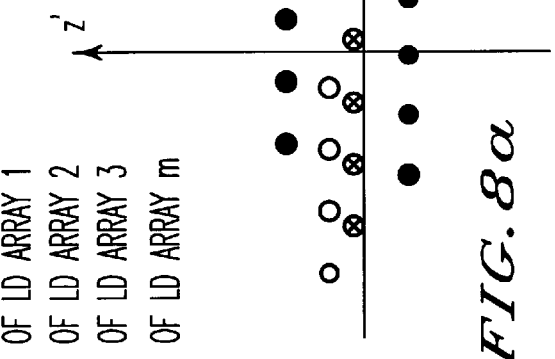
*FIG.8a*

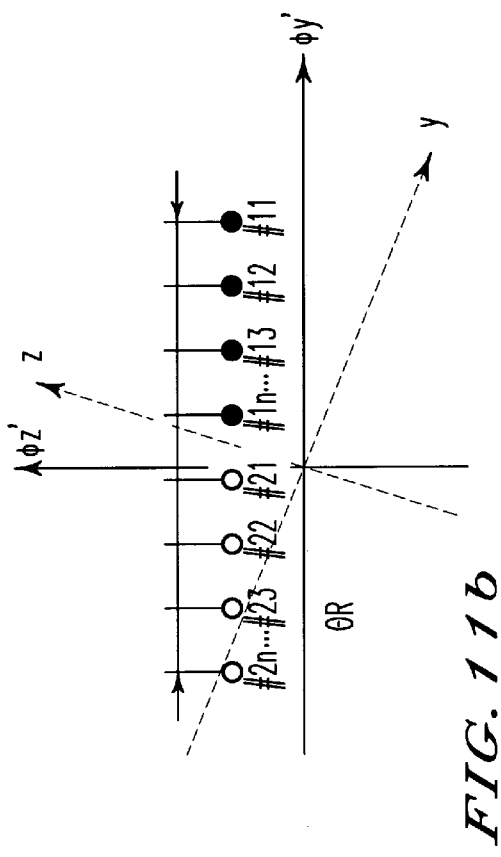
FIG. 11a
FIG. 11b
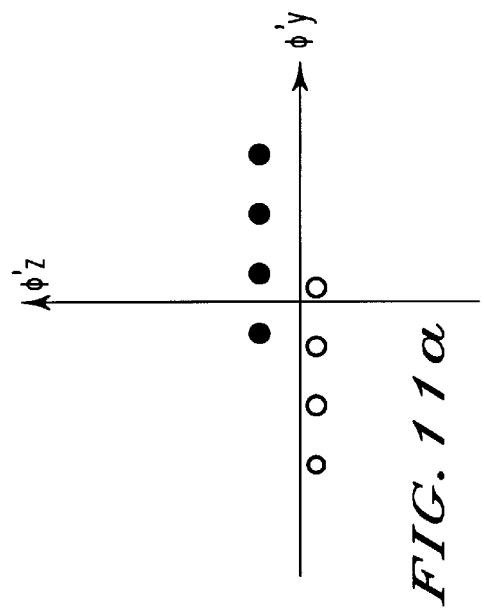
FIG. 11c
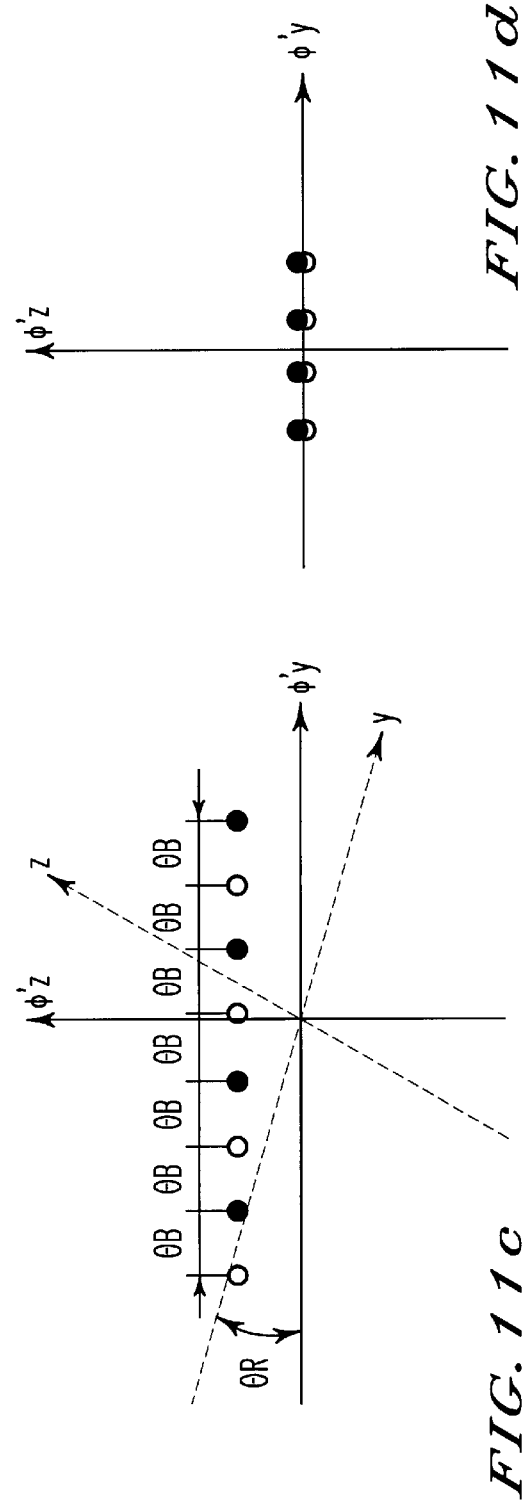
FIG. 11d

MULTIPLE BEAM SCANNING APPARATUS AND LIGHT SOURCE UNIT THEREFOR

BACKGROUND OF THE INVENTION

1. Field of the Invention

The present invention relates to a multiple beam scanning apparatus and a light source unit for a multiple beam scanning apparatus utilized in a high-speed optical writing system for use in a laser printer, digital copying machine, laser facsimile device, etc.

2. Discussion of the Background

To realize high-speed recording, a multiple beam scanning apparatus has been well known as an apparatus capable of simultaneously scanning plural lines of light beams on a photosensitive body and thereby performing image recording. Two types of such multiple beam scanning apparatuses are generally well known. The first type is a beam composing system in which plural semiconductor lasers (laser diodes, hereinafter referred to as a "semiconductor laser") are employed as a light source and light beams emitted from the respective semiconductor lasers are composed by use of a polarization beam splitter, etc. The second type is an array system in which a semiconductor laser array having plural light-emitting points is employed as the light source.

In the case of the array system, it is difficult to procure the semiconductor laser array itself, and if the semiconductor laser array can be procured it is very expensive. In particular, when the number of light-emitting points increases, namely the number of light beams capable of being emitted increases, the difficulty in procurement and costs also increase. Furthermore, in order to obtain a desired beam pitch in the subscanning direction on the photosensitive body, the light-emitting points arranging direction of the semiconductor laser array is set by inclining the direction thereof by a predetermined angle from the main scanning direction.

However, at this time, the greater the number of light beams, the more enlarged the expansion of the beams in the main scanning direction as shown in FIG. 16. FIG. 16 shows a semiconductor laser array 100, a collimator lens 101, a rotatable multiple surface polygon mirror 102, an optical element 103 such as an fθ lens, etc., and a photosensitive body 104. In this type of device there arises a drawback that the rotatable polygon mirror 102 and the optical element 103 are inevitably large-sized.

On the other hand, in the case of the beam composing system, although a widely used ordinary semiconductor laser can be employed, the accuracy of adjustment is very strict for obtaining a predetermined distance between adjacent scanning lines on the photosensitive body. In addition, the relative position of the light beam on the photosensitive body largely changes by optical lever action due to any slight variation of the relative position between the semiconductor lasers caused by temperature variation and vibration, etc. Therefore, it is difficult to stably maintain the predetermined scanning lines distance.

Regarding the above-mentioned points, in the beam composing system plural semiconductor lasers are provided so as to be unitarily combined into one unit together with plural collimator lenses and a beam composing medium. Thereby, time-elapsing variation of the beam pitch can be reduced, and a predetermined scanning lines distance can be obtained by rotating the light source unit for such an optical apparatus around its optical axis. Examples of the above-mentioned proposal have been known hitherto, for example, in Japanese Laid-Open Patent Publication No. 7-181412/1955.

According to the description of this background art, the distance between the scanning lines can be easily set and adjusted with high accuracy. However, as recognized by the present inventor, in the case of realizing a multiple beam number equal to or more than three, it is necessary to use a number of semiconductor lasers equal to the beam number, and thereby the light source unit inevitably turns out to be large-sized.

SUMMARY OF THE INVENTION

The present invention has been made in consideration of the above-mentioned and other problems in order to improve on such various subject matters.

It is, accordingly, an object of the present invention to solve and improve the above-mentioned and other drawbacks in the background arts.

It is another object of the present invention to provide a novel multiple beam scanning apparatus which can realize a multiple beam system utilizing four or more beams with comparatively low cost and without requiring a large-sized light source unit, deflection medium, and focusing optical system, etc.

It is still another object of the present invention to provide a novel multiple beam scanning apparatus which can realize a multiple beam system utilizing four or more beams in which the distance between scanning lines can be adjusted and set with high precision.

It is still another object of the present invention to provide a novel multiple beam scanning apparatus capable of suppressing enlargement of a light beam in a main scanning direction for the realization of four or more multiple beams.

It is still another object of the present invention to provide a novel light source unit which can realize a multiple beams system utilizing four or more beams with comparatively low cost and with a reduced size.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2(a) through 2(d) are schematic diagrams showing with two-dimensional representation respective light-emission angles of mn lines of a beam after composing beams;

FIGS. 3(a) and 3(b) are schematic diagrams showing two examples of forming mn scanning lines;

FIGS. 8(a) through 8(d) are schematic diagrams showing with two-dimensional representation respective light-emission angles of mn lines of a beam after composing beams at a time of adjustment;

FIGS. 11(a) thorough 11(d) are schematic diagrams showing with two-dimensional representation respective light-emission angles of 2n lines of a beam after composing beams;

DETAILED DESCRIPTION OF THE PREFERRED EMBODIMENTS

A first embodiment of the present invention is described hereinafter, referring to FIG. 1 through FIG. 9, and in which like reference numbers indicate identical or corresponding parts throughout the several views.

Figure 1:
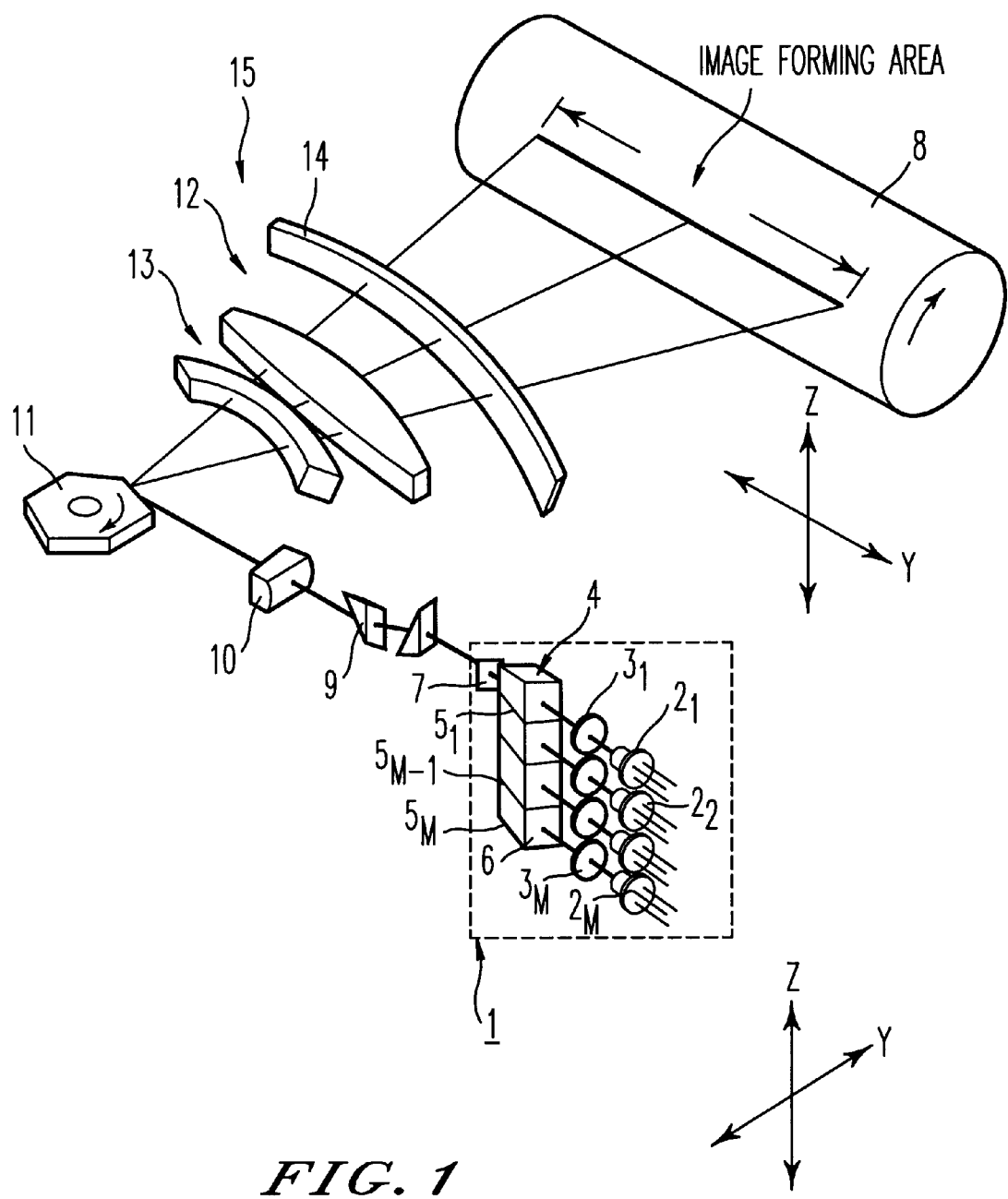
FIG. 1 is an outline perspective view illustrating a fundamental structure of a first embodiment according to the present invention.
Figure 4:
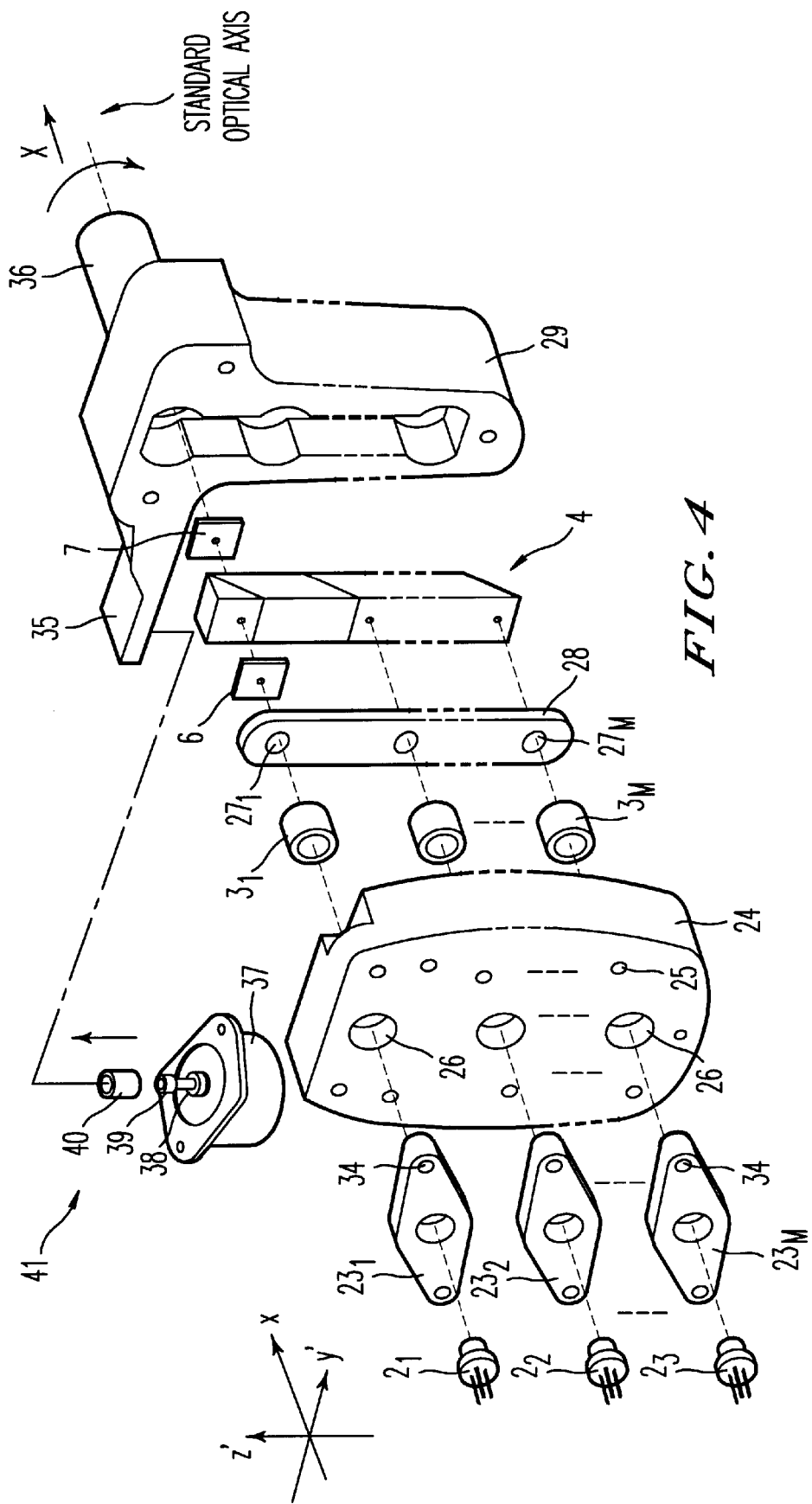
FIG. 4 is an exploded perspective view illustrating an example of a structure of an optical apparatus.

A fundamental structure of the multiple beam scanning apparatus according to the present embodiment applied for a laser printer is now explained, referring to FIG. 1. A light source unit 1 is disposed in the scanning apparatus. The light source unit 1 can simultaneously emit mn lines of multiple beams. The light source unit 1 for use in a multiple beam scanning apparatus is constructed with m pieces of semiconductor laser array $2_1$~$2_m$ respectively having n light-emitting points, m pieces of collimator lens $3_1$~$3_m$ for respectively converting n lines of light beam emitted from said respective semiconductor laser arrays $2_1$~$2_m$ to respective substantially parallel light fluxes, and a beam composing prism 4 employed as a beam composing medium for composing mn lines of light beams respectively converted to parallel light fluxes, in which m is equal to or larger than two (m≧2), and n is also equal to or larger than two (n≧2).

Namely, the light beams emitted from the plural semiconductor laser arrays $2_1$~$2_m$ are respectively collimated. Here, a subscanning correspondence direction signifies a direction parallel corresponding to the subscanning direction z on the imaginary optical path from the light source unit 1 to the surface to be scanned. That is, the surface of the photosensitive body 8 in this embodiment is linearly developed along the optical axis x.

In this connection, another direction parallel corresponding to the scanning (main scanning) direction y on the imaginary optical path where the optical path from the light source to the surface of the photosensitive body 8 is linearly developed along the optical axis x is referred to as the main scanning correspondence direction. Needless to mention, if it is not concretely described, the subscanning correspondence direction is the subscanning direction z, and the main scanning direction is the main scanning direction y. The light beams emitted from the plural semiconductor laser arrays $2_1$~$2_m$ are composed and output with slightly inclined angles, respectively, in the main scanning direction y and the subscanning direction z.

The mn lines of beams as incident light directed to the beam composing prism 4 constructed with the combination of plural beam splitters are composed by the reflection surface $5_m$ of the beam composing prism 4 and the (m−1) beam splitter surfaces $5_1$~$5_{m-1}$, and the beams thus composed are emitted from the light source unit 1.

In the present embodiment, the light source unit 1 is constructed such that the beam splitter surface $5_{m-1}$ is the polarization beam splitter surface. Reading the light beam from the semiconductor laser array $2_{m-1}$, the direction of the linear polarization thereof is rotated by 90°, and the light beam is thereafter directed to the beam composing prism 4 as incident light by use of a half-wavelength plate 6. Thereby, the light beam from the semiconductor laser array $2_{m-1}$ is composed with that from the semiconductor laser array $2_m$ on the beam splitter surface $5_{m-1}$ in the state of minimizing light intensity loss.

Consequently, in the case of not employing the splitter surface of polarization beam, it is not necessary to use the half-wavelength plate 6. On the other hand, a quarter-wavelength plate 7 is provided in front of the beam composing prism 4 as occasion demands, and light utilizing efficiencies proceeding to the photosensitive body 8 can be made almost uniform for respective beams by uniformly converting the mn lines of light beams respectively to circular polarization beams.

The mn lines of light beams emitted from the light source unit 1 are directed as incident light onto the cylinder lens 10 having power in the subscanning direction z through an afocal optical system 9, and are converted to light flux focused in the subscanning direction z. Thereafter, the light beams thus converted are directed as incident light to the reflection surface of rotatable polygon mirror 11 employed as a deflection medium. The afocal optical system 9 constructed with a pair of prisms, plural lenses, etc. is provided as occasion demands. The beam diameter is widened in the main scanning direction y, and is narrowed in the subscanning direction z. As it is called, the beam reforming procedure (procedure of putting the beam shape into order) is practiced. The rotative polygon mirror has plural reflection surfaces, and the incident light beams are reflected and scanned in order on the respective deflection/reflection surfaces by action of the light beam rotation.

The mn lines of light beams reflected on the deflection/reflection surfaces of the rotatable polygon mirror 11 are directed as incident light onto scanning optical system 12. The incident light beams are focused on the photosensitive body 8 as light spots, and the exposing/scanning operation by the light beam is performed in the gross. In the embodiment, the scanning optical system 12 is constructed with fθ lens 13 and troidal lens 14, and the scanning optical system 12 causes incident light beams to be focused on the photosensitive body 8 and to be scanned thereon with almost equal scanning speed. Furthermore, the scanning optical system 12 is not limited to such a structure. For instance, an fθ mirror may be used instead of the fθ lens 13. A focusing optical system 15 is constructed with the afocal optical system 9, the cylinder lens 10, and the scanning optical system 12. The mn lines of light beams emitted from the light source unit 1 are respectively focused on the photosensitive body 8 to form predetermined light spots.

Consequently, in the structure shown in FIG. 1, when the rotatable polygon mirror 11 rotates with an equal speed, the mn lines of light beams are deflected with an equal angular velocity, and mn scanning lines turn out to be scanned in the gross on the photosensitive body 8 with equal speed by action of the mn light beams.

Here, a method of setting the distance between the scanning lines to a predetermined value when the mn lines of light beams form mn scanning lines on the photosensitive body 8 is deeply studied as mentioned hereinafter in detail. Generally, in the multiple beam optical system, the relative positions of light beams on the photosensitive body 8 are respectively determined by the angle between the light beams after light emission through a collimator lens, or to state more precisely, the angle between the light beams after the beam composing and the focal distances fm and fs both in the main scanning direction and in the subscanning direction of the focusing optical system subsequent to the lens. Namely, in a case that the angle between two light beams is $\phi y$ in the main scanning direction y, and $\phi z$ in the subscanning direction z, the relative distance on the photosensitive body 8 between those light beams is almost equal to fm·$\phi y$ in the main scanning direction y, and almost equal to fs·$\phi z$ in the subscanning direction z.

In consideration of the case of the semiconductor laser array 2, assume that the light-emitting distance of the semiconductor laser array 2 is p, the focal distance of the collimator lens 3 is fcol, and the angle setting is executed such that the light-emitting points arrangement direction a of the semiconductor laser array 2 is inclined by angle $\phi m$ from the main scanning direction y. At this time, assuming that, regarding the angle between adjacent light beams emitted from the adjacent semiconductor laser array 2 after emitting the light beams through the collimator lens 3, the main scanning direction component is $\theta$ and the subscanning direction component is $\phi s$, the relationship of the above direction components $\phi m$ and $\phi s$ and others: p, $\theta$, and fcol can satisfy the following equations:

$$fcol \cdot \tan \phi m = p \cdot \cos \theta,$$

$$fcol \cdot \tan \phi s = p \cdot \sin \theta.$$

Consequently, regarding n lines of the light beams emitted from the semiconductor laser array 2, the relationship of the beam distance p'm in the main scanning direction and the beam distance p's can satisfy the following equations:

$$p'm = p \cdot \cos \theta \cdot fm/fcol,$$

$$p's = p \cdot \sin \theta \cdot fs/fcol.$$

Consequently, assuming that the desired distance of the scanning line is Ps, it is preferable that the light emitting point arrangement direction a is set by inclining it from the main scanning direction y by $\theta$ so as to satisfy the following equation:

$$\sin \theta = Ps \cdot fcol/(p \cdot fs).$$

For instance, assume the factors are set as follows:
 p=0.1 mm,
 fs=200 mm,
 fcol=15 mm, and
 Ps=63.5 µm.
The value of $\theta$ becomes equal to 2.7° ($\theta$=2.7°). At this time, the values of $\phi m$ and $\phi s$ respectively become equal to 22.9' and 64.8" ($\phi m$=22.9' and $\phi s$=64.8").

However, as in the present embodiment, in the case of employing plural (m) pieces of semiconductor laser array $2_1 \sim 2_m$, it is necessary to simultaneously perform the adjustment of the angle between the light beams of the respective semiconductor laser arrays $2_1 \sim 2_m$. For instance, an example of n=2 is explained hereinafter referring to FIG. 3.

An ordinary optical axis adjustment is performed by use of collimator lenses $3_1 \sim 3_m$ corresponding to the respective semiconductor laser arrays $2_1 \sim 2_m$. In a case that the respective semiconductor laser arrays $3_1 \sim 3_m$ are rotated by the angle $\theta$, the n lines (two lines) of the respective light beams 11, 12, 21, 22, ~, m1, m2 become of a same angle after the corresponding collimator lenses $3_1 \sim 3_m$ respectively emit the light beams. In other words, all of the angles between the respective light beams and the respective optical axes x1, x2, ~, xm are equal to each other. Namely, the angles of the light beams 11, 21, ~, m$_1$ are respectively ($-\phi$ m/2 and $-\phi$ s/2). Consequently, those light beams are superposed on each other on the photosensitive body 8.

Therefore, it is necessary to adjust the light beam angle between the semiconductor laser arrays $2_1 \sim 2_m$.

Figure 18:
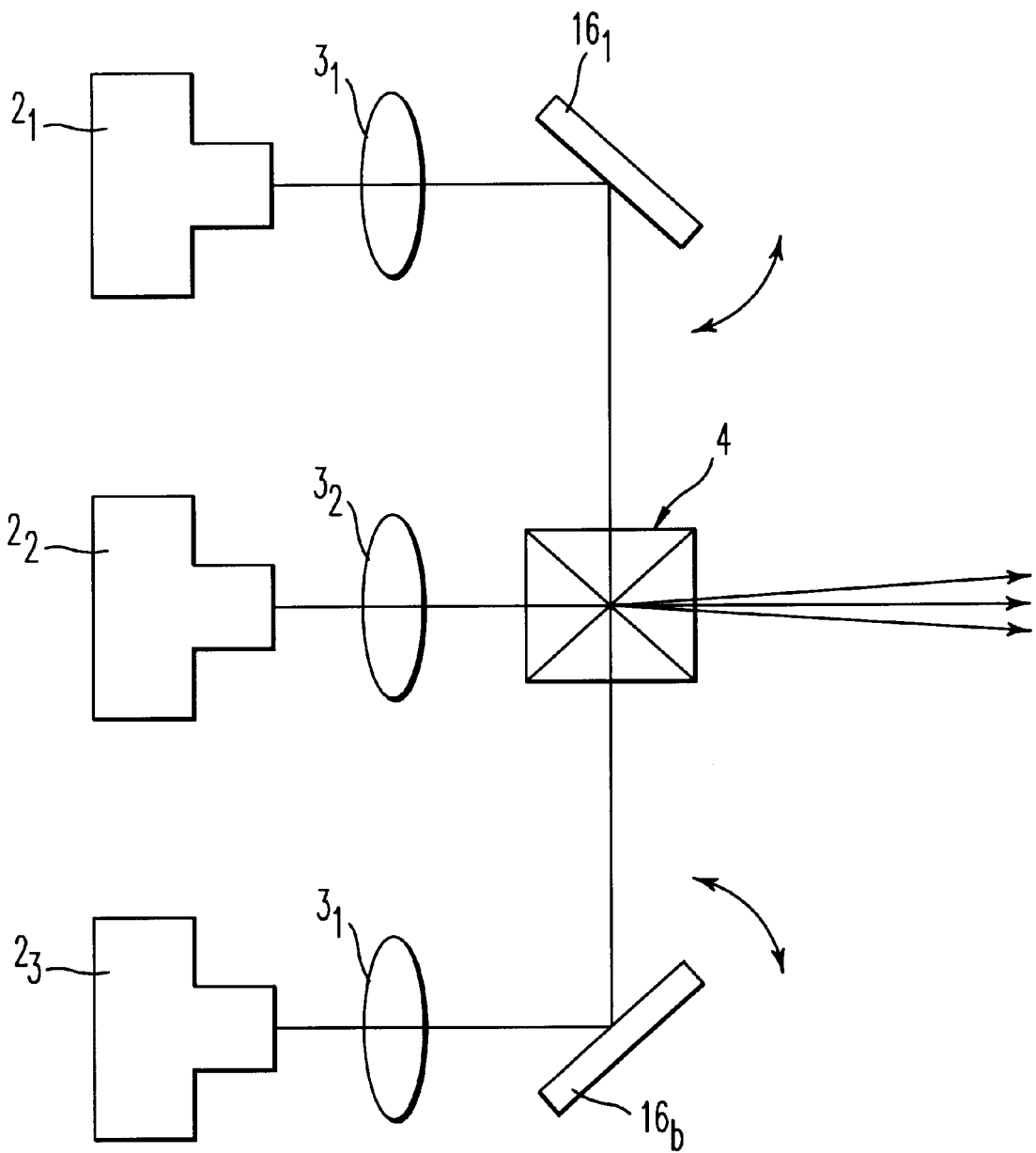
FIG. 18 is an outline side view showing a mirror variable system.

However, as the above-mentioned method, if the beam angle between the semiconductor laser arrays $2_1 \sim 2_3$ is intended to be directly adjusted by inclining the mirrors 16a and 16b arranged between the collimator lenses $3_1 \sim 3_m$ and the beam composing prism 4 in the subscanning direction as shown in FIG. 18 (the case of m=3), precision of the second order is required inevitably to the setting angle of the mirrors 16a and 16b in consideration of the angle $\phi s$ between the light beams in the aforementioned subscanning direction z.

Nevertheless, for instance, if the adjustment of the light beam angle between the semiconductor laser arrays $2_1 \sim 2_m$ is intended to be performed by rotating the entire light source unit 1 after adjusting the beam angle in the respective semiconductor laser arrays $2_1 \sim 2_m$ by action of rotation of the respective individual semiconductor laser arrays $2_1 \sim 2_m$, the respective semiconductor laser arrays $2_1 \sim 2_m$ are also rotated simultaneously, and thereby the beam angles in the respective semiconductor laser arrays $2_1 \sim 2_m$ are inevitably shifted from the setting value. Furthermore, contrary to the above case, if the light beam angle in the semiconductor laser arrays $2_1 \sim 2_m$ is intended to be adjusted by action of rotation of the respective individual semiconductor laser arrays $2_1 \sim 2_m$ after rotating the entire light source unit 1 and setting the beam angle between the semiconductor laser arrays $2_1 \sim 2_m$, the beam angle between the semiconductor laser arrays $2_1 \sim 2_m$ even due to a slight shift of the rotating shaft at the time of rotating the respective individual semiconductor laser arrays $2_1 \sim 2_m$.

In conclusion, it is difficult to keep the independence of the beam angle adjustment in the semiconductor laser arrays $2_1 \sim 2_m$ and the beam angle adjustment between the same semiconductor laser arrays $2_1 \sim 2_m$.

At this point, in the present embodiment, the beam angle adjustment in the case of employing the m pieces of semiconductor laser arrays $2_1 \sim 2_m$ for emitting the respective n lines of light beams can be easily realized by utilizing the following method, which is described concretely hereinafter.

Namely, in the light source unit 1 of the present embodiment, the m pieces of semiconductor laser arrays $2_1 \sim 2_m$ are arranged such that the light-emitting points arranging directions y' become parallel to each other. In addition, the angles between all of the mn lines of light beams emitted from the beam composing prism 4 are set to become equal to the predetermined angle $\theta B$ between the light beams in the light-emitting points arrangement direction y', and so as to become almost zero in the direction perpendicular to the light-emitting points arrangement direction y'. The semiconductor laser arrays $2_1 \sim 2_m$, the collimator lenses $3_1 \sim 3_m$, and the beam composing prism 4 are substantially combined into one unit. The light source unit 1 thus unitarily combined is structured to be inclined as a whole in the light-emitting points arrangement direction y' by the predetermined angle θR from the main scanning direction y by use of an inclination adjusting medium.

Namely, since the mn lines of the light beams emitted from light source unit 1 are constructed such that the relative angles thereof have a same angle θB only in the light-emitting points arrangement directions y', substantially, the above-mentioned structure turns out to be optically equivalent to one light source unit structured with one piece of a semiconductor laser array having mn light-emitting points and one collimator lens.

Consequently, it is preferable to perform the angle setting such that the light source unit 1 is inclined by the predetermined angle θR. For instance, the angle setting can be easily performed by rotating the entire light source unit 1 around the optical axis of the emitted light beam, and the adjustment accuracy to be required is not that strict.

The principle of adjustment according to the present embodiment is described hereinafter, referring to the schematic diagram of FIGS. 2(a)–2(d).

FIGS. 2(a)–2(d) are explanatory diagrams for illustrating a state of such adjustment. After composing light beam, the angle between the mn lines of light beam and the optical axis x is represented, respectively, by the component φy' in the direction of arranging the light-emitting portion and by the component φz' in the direction perpendicular thereto. In practice, a lens is disposed in front of the light source unit 1, and it is possible to detect the angle by observing focusing points of the respective light-emitting portions on the focusing surface of the lens. At the time of adjusting the angle, a sensor such as a CCD area sensor, a PSD (position sensitive device), etc. is disposed on the focusing surface of the lens, and optical adjustment is performed by use of the above sensor.

At first, the alignment of the respective laser arrays $2_1$~$2_m$ is established such that directions of arranging the light-emitting portions become the same to each other. Consequently, if there exists neither shift of the optical axis between the collimator lenses nor a mechanically processing error of the beam composing medium, n lines of light beams emitted from the laser array 2 represented by black dots, n lines of light beams emitted from the laser array 2 represented by white (blanked) dots, ..., n lines of light beams emitted from the laser array $2_m$ are respectively shown by the n points which are respectively arranged at a uniform interval in directions almost parallel with that of arranging the light-emitting portions. See FIG. 2(a).

At this time, in a case that directions of arranging the light-emitting portions are relatively inclined from each other, the angle is adjusted by rotating the laser array 2 around the optical axis. Namely, by shifting the respective laser arrays $2_1$~$2_m$ by a small amount (distance) on the surface perpendicular to the optical axis, the mn lines of the light beams can be adjusted to arrange the light beams at an equal interval θB on a same straight line as shown in FIGS. 2(b) and 2(c). Thereafter, the light source unit 1 adjusted in such a way is established such that the direction of arranging the light-emitting portion is inclined by a predetermined angle θR from the main scanning direction, for instance, by rotating the optical axis.

If the ordinary adjustment for the optical axis is performed so as to cause the center of the light-emitting point to coincide with the optical axis of the collimator lens, the light beam of the laser arrays $2_1$~$2_m$ are superposed on each other on a same position as shown in FIG. 2(d). As a result, both of the beams turn out to scan on the same position of the photosensitive body 8, regardless of the angle between the direction of arranging the light-emitting portion and the other direction of the scanning (main scanning).

Here FIG. 2(b) is an explanatory diagram for illustrating the formation of the scanning lines. As is apparent from the successive n lines of the scanning line are formed by the light beam from the semiconductor laser array $2_1$, another successive n lines of the scanning line can be formed by the light beam from array $2_2$, still other successive n lines of the scanning line can be formed by the light beam from arrays $2_3$, ..., and still another successive n lines of the scanning line are formed by the light beam from array $2m$. Consequently, mn lines of the scanning line can be formed in total. See also FIG. 3(a).

Namely, assuming that the distance between the light-emitting points is p, the focal distance of the collimator lenses $3_1$~$3_m$ is fcol, regarding the n lines of the light beam in the respective semiconductor laser arrays $2_1$~$2_m$, the angle θB between those light beams satisfies the following equation:

$$\theta B = \tan^{-1}(p/fcol).$$

Furthermore, assuming that i=1, 2, 3, ..., m–1, the angle formed between the n-th light beam of the i-th semiconductor laser array $2i$ and the first light beam of the (i+1)-th semiconductor laser array $2i+1$ also satisfies by the following equation:

$$\phi B = \tan^{-1}(p/fcol).$$

Thereby, it turns out to be possible to realize an optically equivalent structure to a single semiconductor laser array having mn receiving portions with an interval p of the light-receiving portions.

Furthermore, assuming that the focal distance of the focusing optical system 15 in the subscanning direction z is fs and the desired distance between the scanning lines on the photosensitive body 8 is Ps, the direction of arranging the light-emitting points is inclined by the angle θR which satisfies the following equation:

$$\phi B \cdot \sin \theta R = \tan^{-1}(Ps/fs).$$

Thereby, on the photosensitive body 8, it is possible to realize the predetermined interval between scanning lines satisfying the following equation:

$$P's = fs \cdot \tan(\theta B \cdot \sin \theta R) = Ps.$$

As a concrete example, assuming that p=0.1 mm, fs=200 mm, and fcol=15 mm, an example of actual numerical values is shown as follows:

θB=22.9°

θR=2.73° (400 dpi:at the time of Ps=63.5 μm),

θR=1.82° (600 dpi:at the time of Ps=42.3 μm),

θR=1.37° (800 dpi:at the time of Ps=31.8 μm),

θR=0.91° (1200 dpi:at the time of Ps=21.2 μm),

Here, it is understood that the relationship between the angle θR and the desired distance Ps between the scanning lines turns out to be almost linear. In addition, the light beam distance on the photosensitive body 8 in the main scanning direction y is represented by the following equation:

$$P'm = fm \cdot \theta B \cdot \cos \theta R.$$

In a case that the value of the angle θR is small, the light beam distance can be represented by the following approximated equation:

$$Pm' \approx fm \cdot \theta B = fm \cdot \tan^{-1}(p/fcol).$$

Furthermore, FIG. 2(c) corresponds to a further feature of the present invention. In FIG. 2(c), the scanning lines are formed per m lines, namely, every (m-th) line by use of light beams emitted from the respective semiconductor laser arrays $2_1$~$2_m$, and the distance gap between the scanning lines is formed such that the scanning lines therebetween are buried by light beams emitted from other semiconductor laser arrays $2_1$~$2_m$. As a result, successive mn lines of the scanning line are simultaneously formed (by only one time scanning). See also FIG. 3(b).

Consequently, assuming that the distance between light-emitting points fcol is p, and the focal distance of the collimator lenses $3_1$~$3_m$ is fcol, the angle θB is established between adjacent light beams so as to satisfy the following equation:

$$\theta B = \tan^{-1}\{p/(m \cdot fcol)\}.$$

By setting the angle θB in such a way, it is possible to realize a structure optically equivalent to a single semiconductor laser array having mn light emitting portions in which the interval between the light-emitting portions is p/m.

Moreover, assuming that the focal distance of the focusing optical system 15 in the subscanning direction z is fs and the desired distance between the scanning lines on the photosensitive body 8 is Ps, the angle is set such that the light-emitting points arrangement direction y' and the main scanning direction y are inclined by the angle θR satisfying the following equation:

$$\theta B \cdot \sin \theta R = \tan^{-1}(Ps/fs).$$

Thereby, the angle is set so as to obtain the desired distance between the scanning lines on the photosensitive body 8, satisfying the following equation:

$$P's = fs \cdot \tan(\theta B \cdot \sin \theta R) = Ps.$$

As a concrete example, assuming that p=0.1 mm, fs=200 mm, and fcol=15 mm, the example of actual numerical values is shown as follows:

θB=22.9°/m,

θR=2.73×m° (400 dpi:at the time of=63.5 μm),

θR=1.82×m° (600 dpi:at the time of=42.3 μm),

θR=1.37×m° (800 dpi:at the time of=31.8 μm), and

θR=0.91×m° (1200 dpi:at the time of=21.2 μm),

Here, it is understood that the relationship between the angle θR and the desired distance Ps between the scanning lines turns out to be almost linear. In addition, the light beam distance on the photosensitive body 8 in the main scanning direction y is represented by the following equation:

$$Pm' = fm \cdot \theta B \cdot \cos \theta R.$$

In a case that the value of the angle θR is small, the light beam distance can be represented by the following approximated equation:

$$Pm \approx fm \cdot \theta B = fm \cdot \tan^{-1}\{p/(m \cdot fcol)\}.$$

Moreover, the calculation formulas and the numerical value examples concerning FIGS. 2(b) and 2(c) and FIGS. 3(a) and 3(b) have been explained in connection with a case in which light beams emitted from the collimator lenses $3_1$~$3_m$ are converted to parallel light fluxes by action of the collimator lenses $3_1$~$3_m$. On the other hand, there exists another type of scanning optical system in which light beams from the collimator lenses $3_1$~$3_m$ are employed after being converted to predetermined focused light fluxes or diffused light fluxes in the scanning optical system 12.

Although the aforementioned calculation formula and numerical value example require more or less correction, the aforementioned type of the scanning optical system can be also applied to an optical system in almost the same way.

Hereupon, in the present embodiment, a structure for and a method of arranging properly (making uniform) the light-emitting points arrangement direction y' in a same direction and a method of adjusting the angle θB between the light beams are described hereinafter, referring to FIG. 4 through FIG. 8.

Figure 5:
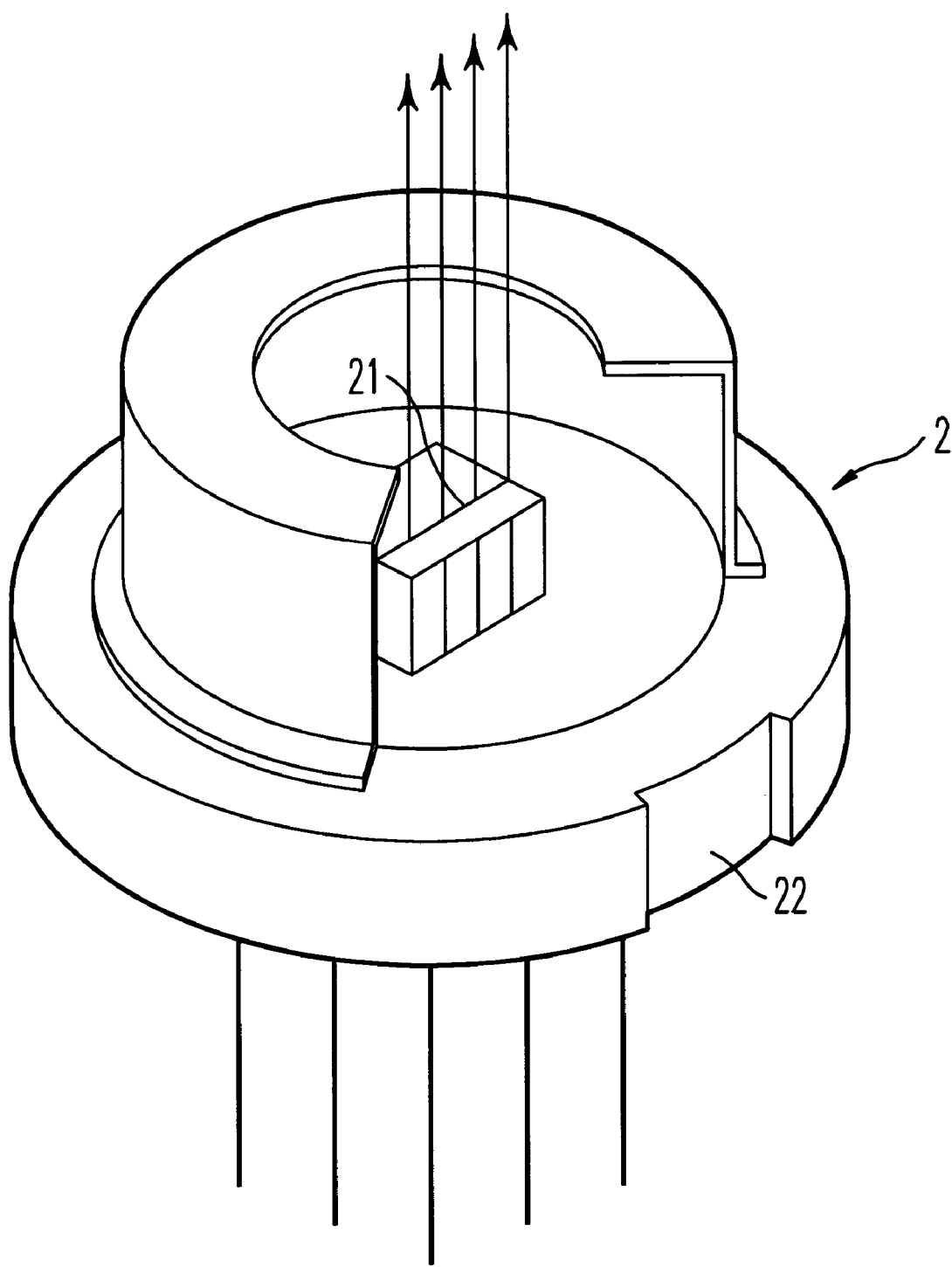
FIG. 5 is a perspective view illustrating an example of a partially exploded structure of a semiconductor laser array.
Figure 6:
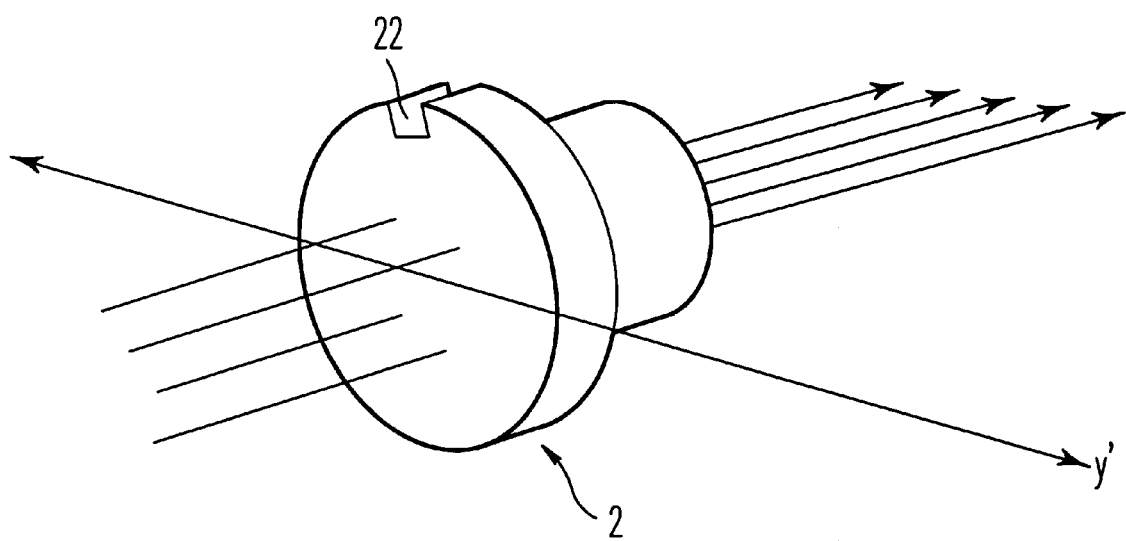
FIG. 6 is an external appearance perspective view showing a semiconductor laser array.

At first, with respect to the employed semiconductor laser arrays $2_1$~$2_m$, a notch portion 22 is provided in a direction perpendicular to (or parallel with) the junction surface 21 which coincides with the light-emitting points arrangement direction y' as shown in FIG. 5 and FIG. 6, and thereby the direction y' can be determined by searching for the position of the notch portion 22.

In such a structure, the semiconductor laser arrays $2_1$~$2_m$ are pressedly inserted and fixed in respective supporting bodies $23_1$~$23_m$ to make the light-emitting points arrangement directions y' uniform on a standard basis of the position of the notch portion 22. On this occasion, in the present embodiment, the uppermost-ranked semiconductor laser array $2_1$ is the standard for the adjustment. However, any other semiconductor laser array 2i can be the standard for adjustment or any one of the semiconductor laser arrays is not decided as the standard. Each of the semiconductor laser arrays is fixed on base body 24 by use of screw(s) through intermediation of the supporting bodies $23_1$~$23_m$. Loose holes 25 for fixing the supporting bodies $23_1$~$23_m$ with screws, from the side of the base body 24, are formed on the base body 24. In such a structure, the semiconductor laser arrays $2_1$~$2_m$ are tentatively fixed on the base body 24 with screws from the side of the base body 24 through intermediation of the respective supporting bodies $23_1$~$23_m$.

Furthermore, the collimator lenses $3_1$~$3_m$ accommodated in the respective mirror cylinder are inserted to be firmly fixed in the firmly-fixing holes 26 formed on the base body 24 and bonded thereto with adhesive agent, after positioning with the respective semiconductor laser arrays $2_1$~$2_m$. Next, an aperture member 28 in which apertures $27_1$~$27_m$ for reforming (putting the waveform into order) the light beam from the respective semiconductor laser arrays $2_1$~$2_m$, a flange portion 29 for accommodating and supporting therein a half-wavelength plate 6, a beam composing prism 4, and a quarter-wavelength plate 7 are fixed on the base body 24 with screws. The flange portion 29 is formed to freely move through the aforementioned loose holes 25. Furthermore, the aperture member 28 for reforming the light beam (into a regular form) can be disposed in front of the light beam composing prism 4 at either one of positions after (on the rear side of) cylinder lens 10.

However, an effect of enabling the removal of harmful light is enhanced by disposing the aperture member 28 including m apertures $27_1$~$27_m$ which are large a little large and formed therein between the collimator lenses $3_1$~$3_m$ and the beam composing prism 4.

Furthermore, the half-wavelength plate 6 and the quarter-wavelength plate 7 are not absolutely necessary as mentioned before, and it is not always necessary to form the aperture member 28 unitarily.

Figure 7:
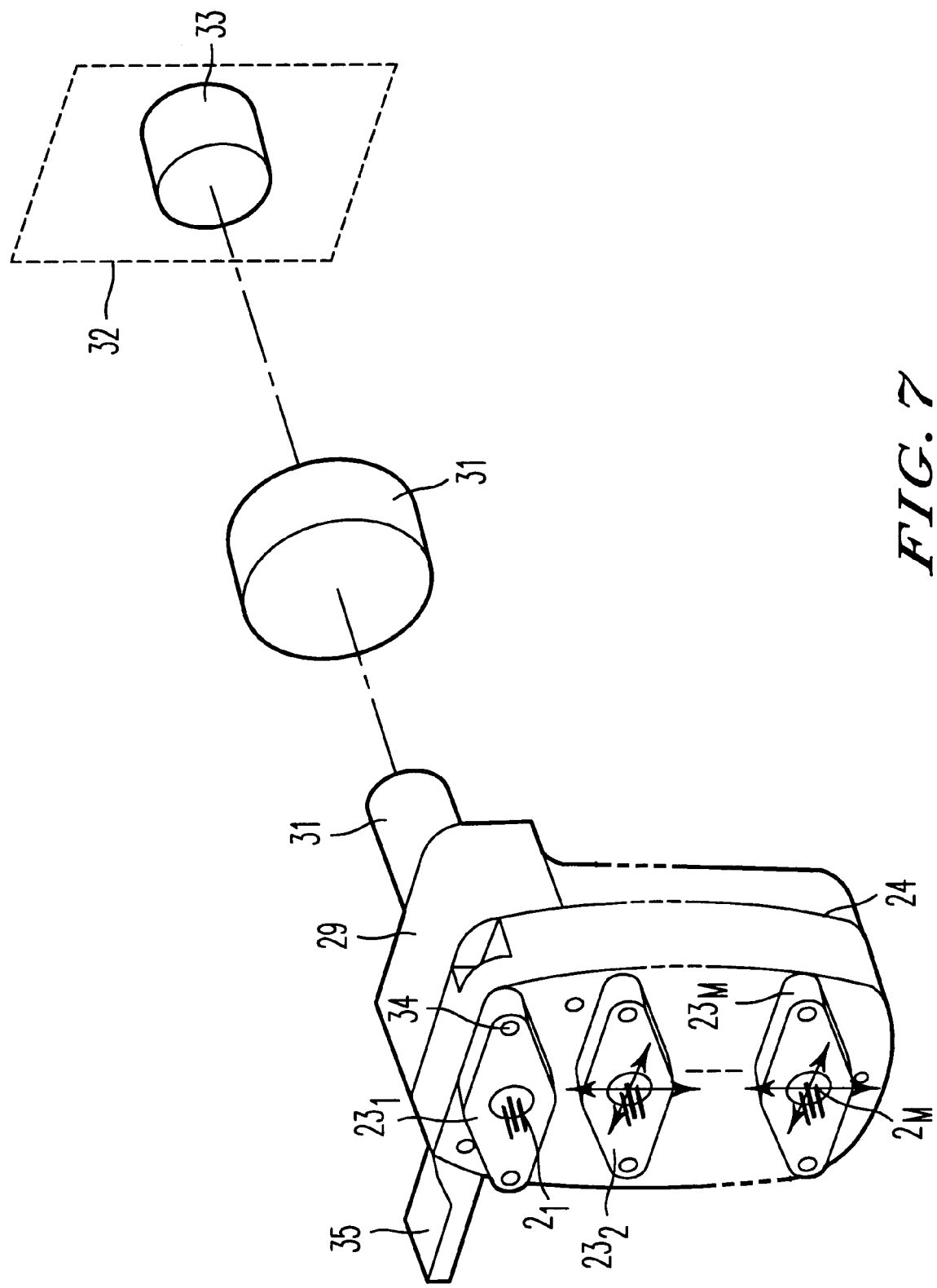
FIG. 7 is a perspective view illustrating an example of a structure at a time of adjustment.

In such a structure as mentioned heretofore, the light source unit 1 is put in a state of assembling all other parts excluding the supporting bodies $23_1$~$23_m$ temporarily fixed with the screws on the base body 24. The semiconductor laser arrays $2_1$~$2_m$ are fixed on the supporting bodies $23_1$~$23_m$. Here, the light source unit 1 itself is fixed on the entire main body of the apparatus by use of a jig (not shown). An adjustment lens 31 is disposed in front of the light source unit 1 as shown in FIG. 7. As to this adjustment lens 31, the lens 31 employed at the time of the collimation adjustment can be used as it is. The sensors 33 such as a CCD area sensor, PSD, etc. are arranged on the focusing image surface 32. In such a structure, the state of the light beams focused on the focusing image surface 32 of the adjustment lens 31 can be detected.

The supporting bodies $23_1$~$23_m$ are tightly brought into contact with the base body 24 by pushing female (negative) screw holes 34 from the left side by use of pins, and all of the screws employed for the tentative fixing are removed, and thereafter the moving adjustment is performed on the plane y'-z'.

In a case that the collimation adjustment as mentioned above was performed ideally, the light beams on the focusing surface 32 turn out as shown in FIG. 8(d). Even in a case that the shifting thereof occurs more or less, the light beams of the respective semiconductor laser arrays $2_1$~$2_m$ are put in a state of being almost in parallel with each other as shown in FIG. 8(a).

Hereupon, when the supporting body $23_1$ of the semiconductor laser array $2_1$ is fixed, the other supporting bodies $23_2$~$23_m$ are in order brought into close contact with the base body 24 and slightly moved. Thereby, as shown in FIG. 8(b) or FIG. 8(c), the adjustment is executed such that the respective light beams are aligned on a straight line, and the supporting bodies 23i thus adjusted are fixed in order with screws on the base body 24 from the side of the base body 24.

Furthermore, even in a case of not setting the standard semiconductor, it may be possible to respectively perform adjustment of the light beams in order such that respective light beams are aligned on a straight line at an equal interval, by establishing the firstly adjusted light beam of the semiconductor laser array 2i fixed on the supporting body 23i.

To state this case more concretely, for instance, two pieces of a pin corresponding to female screw holes 34 of the supporting bodies $23_1$~$23_m$ are mounted on a movable stage of two axes (the light-emitting points arrangement direction y' and the other direction z' perpendicular thereto) or three axes (y', z', and rotation around the optical axis x). The supporting bodies $23_1$~$23_m$ are pressed to the base body 24 with the pin through the spring member in the x axis direction (optical axis direction) and the pin is moved on the y'-z' plane with the movable stage, and thereby the supporting bodies $23_1$~$23_m$ are also moved.

Anyway, it is preferable that the assembling and adjustment of the light source unit 1 itself are finished in such a way, and thereafter, the entire light source unit 1 is rotated around the optical axis, and further the light-emitting points arrangement direction y' and the main scanning direction y are set such that the angle therebetween is equal to θR.

Here, returning to FIG. 4 or FIG. 7, a lever 35 is formed at the side surface of the flange portion 29, and a cylindrical projecting portion 36 is formed at the light beam emitting portion of the flange portion 29. The light source unit 1 is combined with the main body of the multiple beam scanning apparatus as shown in FIG. 1, employing the cylindrical projecting portion 36 as a guiding member. A cylindrical member 39 which is tightly inserted onto the shaft 38 of the stepping motor 37 and has a male screw formed on the outer circumferential surface is engaged with the male screw hole formed on the actuator 40. In such a structure, the actuator 40 is disposed to be moved in parallel in the direction as shown by an arrow in FIG. 4 in accordance with the rotation of the stepping motor 37. The actuator 40 is brought into direct contact with the lever 35 of the flange portion 29, and thereby the light source unit 1 is rotated around the center axis (standard optical axis) of the cylindrical projecting portion 36. An inclination adjusting unit 41 is constructed of the lever 35, the projecting portion 36, the stepping motor 37, and the actuator 40, etc. The angle of the light source unit 1 is set such that the angle becomes equal to the predetermined angle θR. Needless to mention, the rotation adjustment of the light source unit 1 can be performed by moving the lever 35 of the flange portion 25 by use of a micrometer head, etc. in the direction perpendicular to the lever 35.

Figure 9:
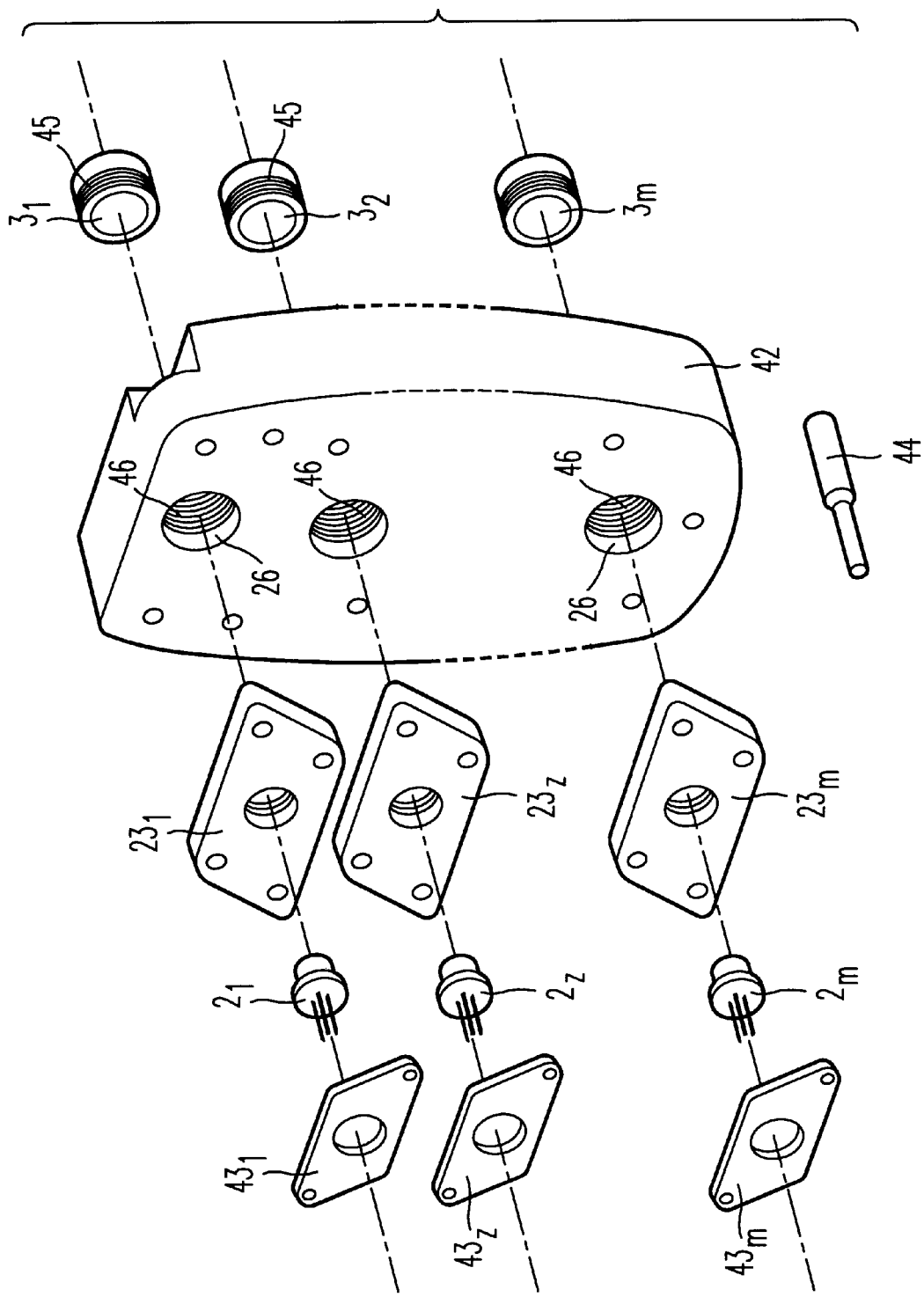
FIG. 9 is an exploded perspective view illustrating a modification of a base board.
Figure 10:
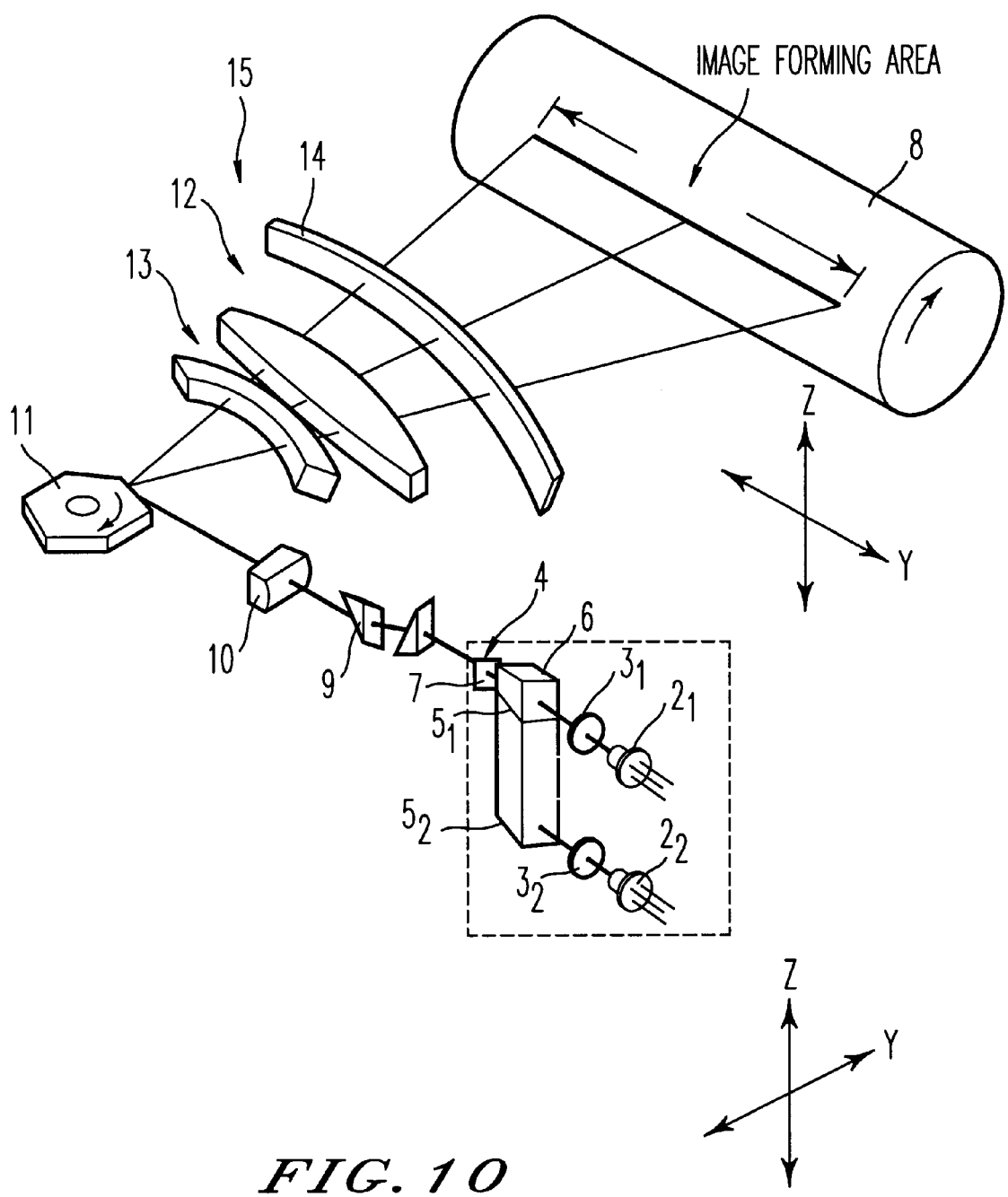
FIG. 10 is an outlined perspective view illustrating a fundamental structure as a modification of m=2.
Figure 12A:
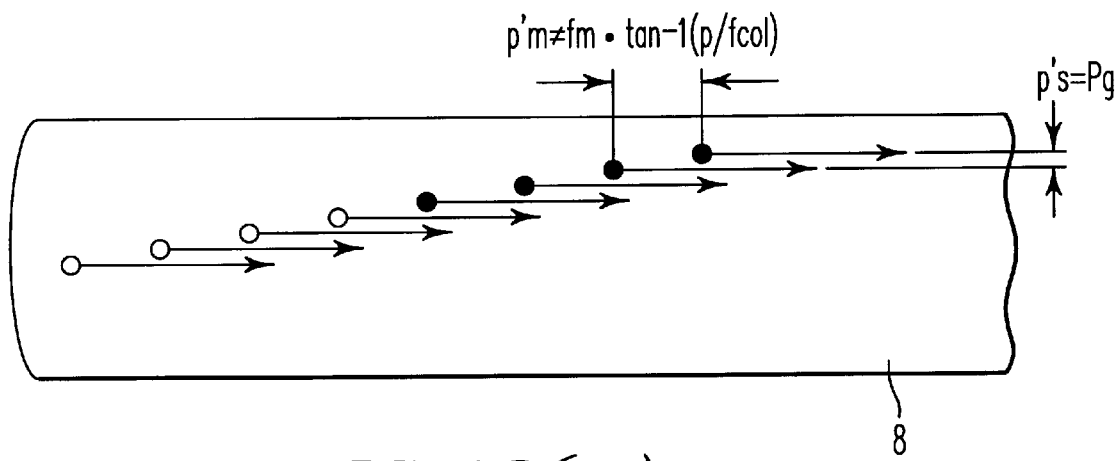
FIGS. 12(a) and 12(b) are schematic diagrams showing two examples of forming 2n scanning lines.
Figure 12B:
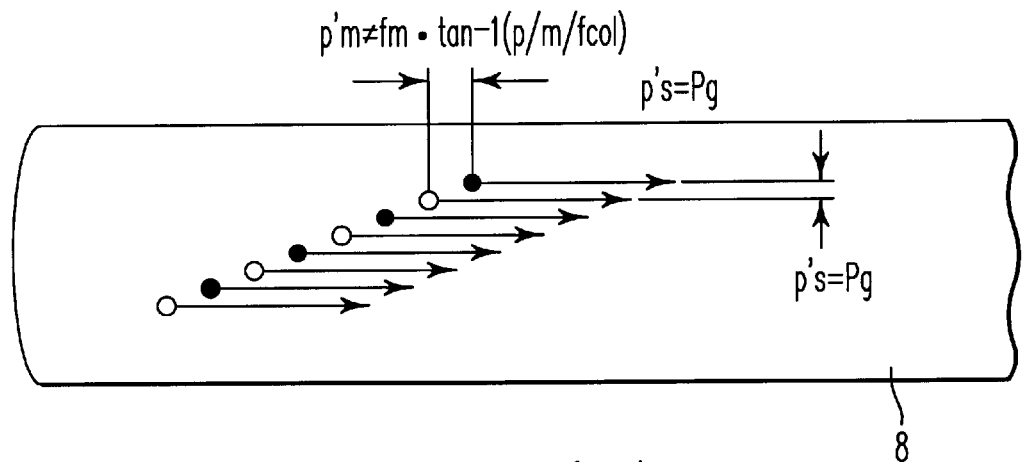
Figure 13:
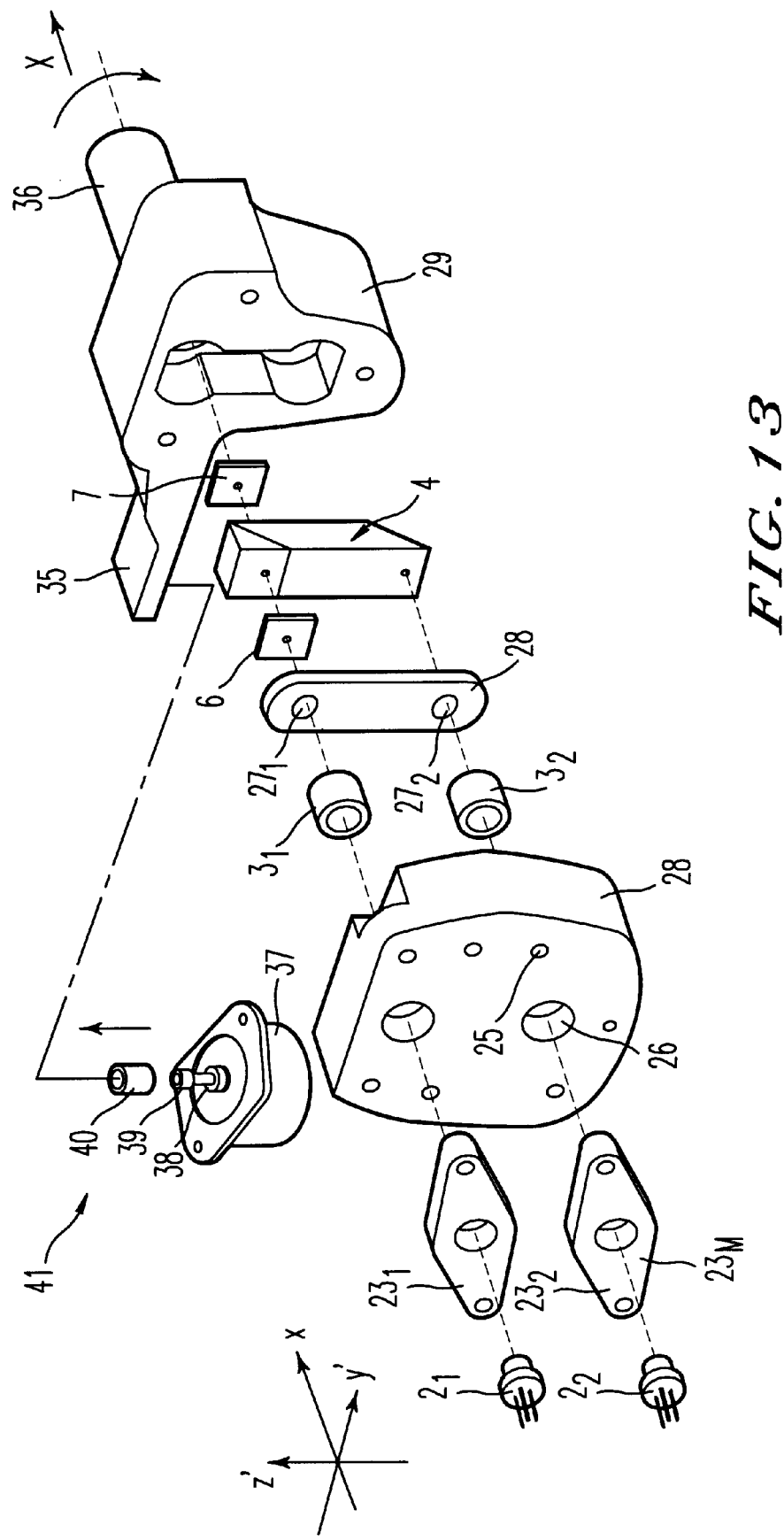
FIG. 13 is an exploded perspective view illustrating a structural example of an optical apparatus in the case of m=2.
Figure 14:
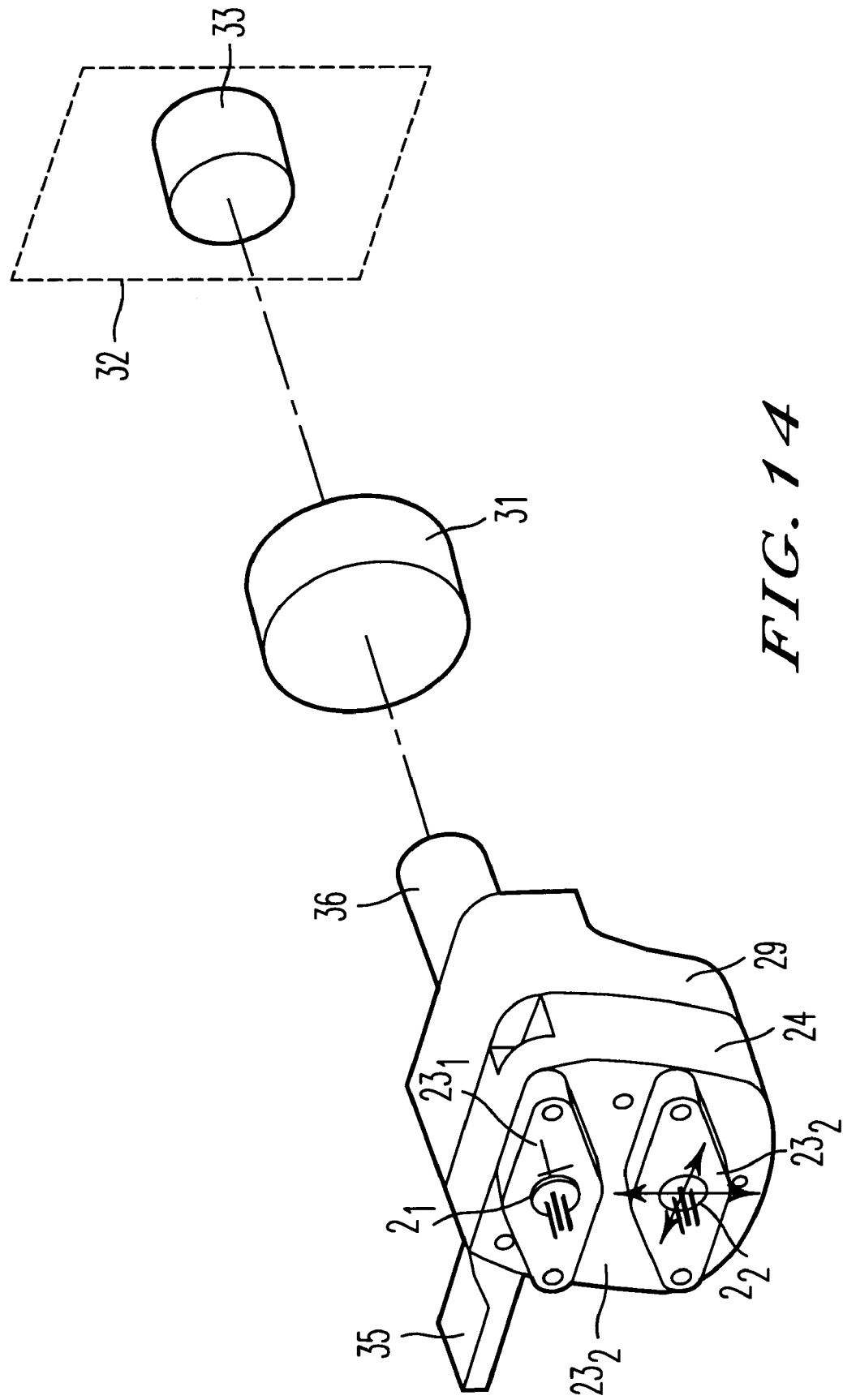
FIG. 14 is a perspective view illustrating an example of a structure at a time of adjustment in the case of m=2.

FIG. 9 shows an example of a variation of the base body 42 in the light source unit 1. In this variation, the respective semiconductor laser arrays $2_1$~$2_m$ are fixed with screws on the corresponding supporting bodies $23_1$~$23_m$ such that the light-emitting points arrangement directions are made equal to each other by use of pressing plates $43_1$~$43_m$.

Furthermore, the respective supporting bodies $23_1$~$23_m$ are brought into close contact with the base body 42. The loose hole 25 and the female screw hole 34 formed on the respective supporting bodies $23_1$~$23_m$ have inserted thereto the tentative positioning pin 44 and are tentatively positioned.

Thereafter, the respective supporting bodies $23_1$~$23_m$ and the base body 42 are tentatively fixed to each other with screws. Furthermore, a male screw 45 is formed on the outer circumferential surface of the mirror cylinder for use in the collimator lenses $3_1$~$3_m$. The tightly engaging hole 26 at the side of the base body 42 having the male screw 45 formed thereon is engaged with the respective laser arrays $2_1$~$2_m$ for positioning therebetween. The so-called collimation adjustments are performed in order per each of the respective pairs of the semiconductor laser arrays $2_1$~$2_m$ and the collimator lenses $3_1$~$3_m$.

Hereupon, in the present embodiment, although m pieces of the semiconductor laser arrays $2_1$~$2_m$ are adjacently arranged in the subscanning direction z, the arrangement direction of the semiconductor laser arrays $2_1$~$2_m$ is optional, namely, it is not limited to the subscanning direction.

Furthermore, both of the number n of the light-emitting points and the number m of the semiconductor laser arrays are also optional. These numbers are allowed to be at least two. FIG. 10 through FIG. 14 are explanatory diagrams of a modification showing an example of a structure in which m is equal to 2, namely, two pieces of semiconductor laser arrays $2_1$ and $2_2$ are employed in order to obtain 2n lines of light beams. As the detail of this structure can be understood by the description of the aforementioned embodiment, the explanation thereof is omitted here.

According to the modification as mentioned above, securing the possibility of realizing a multiple beam of four or more beams, the light source unit 1 can be small-sized. In addition, the polarizing property (for linear polarization) of the light beam from the semiconductor laser array $2_1$ is utilized. To state this more concretely, the polarized beam splitter surface is used for the half-wavelength plate 6 and the beam composing prism 4. In such a structure, an effect of largely reducing light loss at the time of composing the beam and raising utilization efficiency can be realized. Furthermore, by reducing the number of semiconductor laser arrays, setting and adjustment of the distance between the scanning lines can be further simplified.

Figure 15:
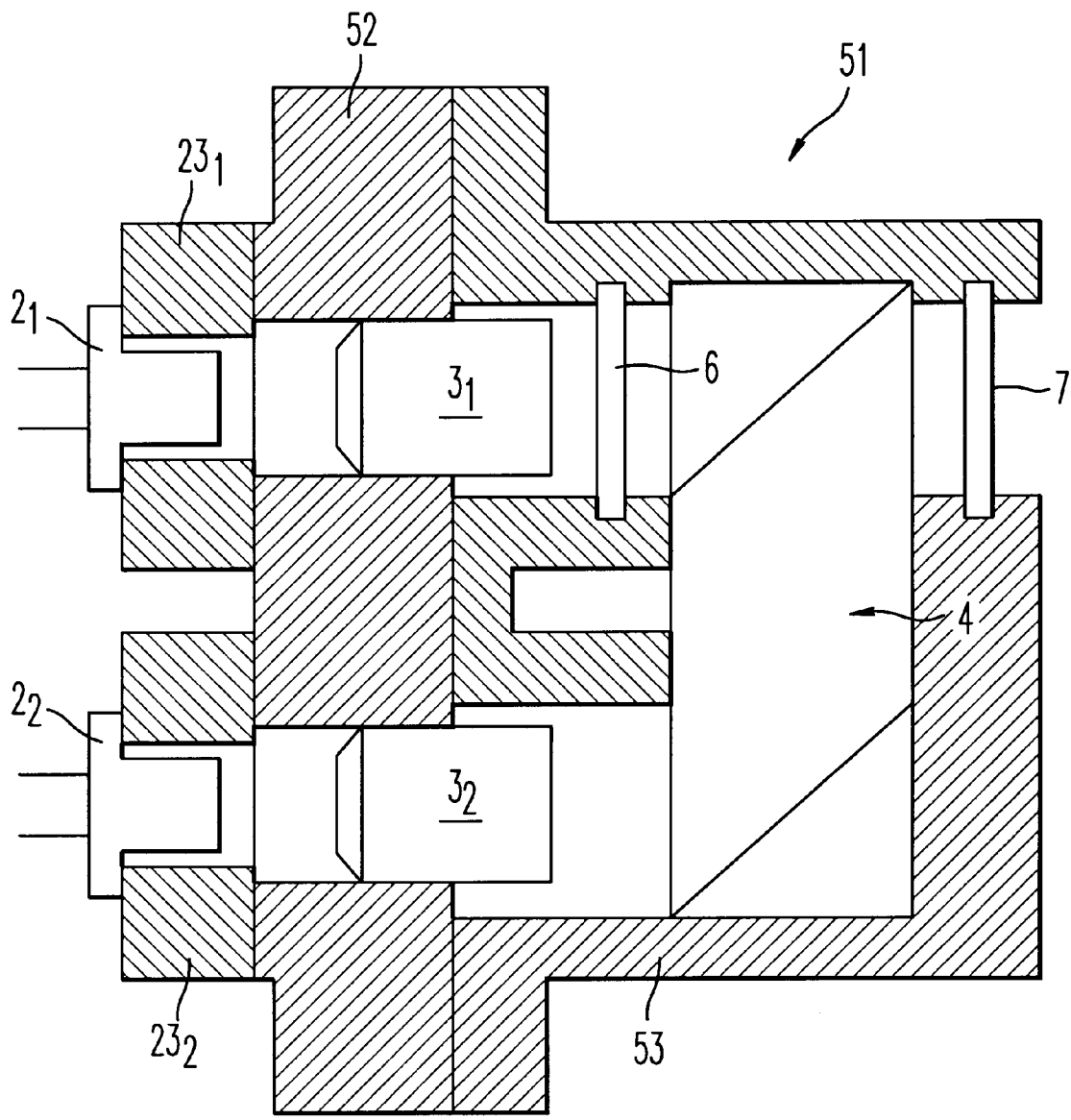
FIG. 15 is a cross-sectional view of an optical apparatus showing a second embodiment of the present invention.
Figure 16:
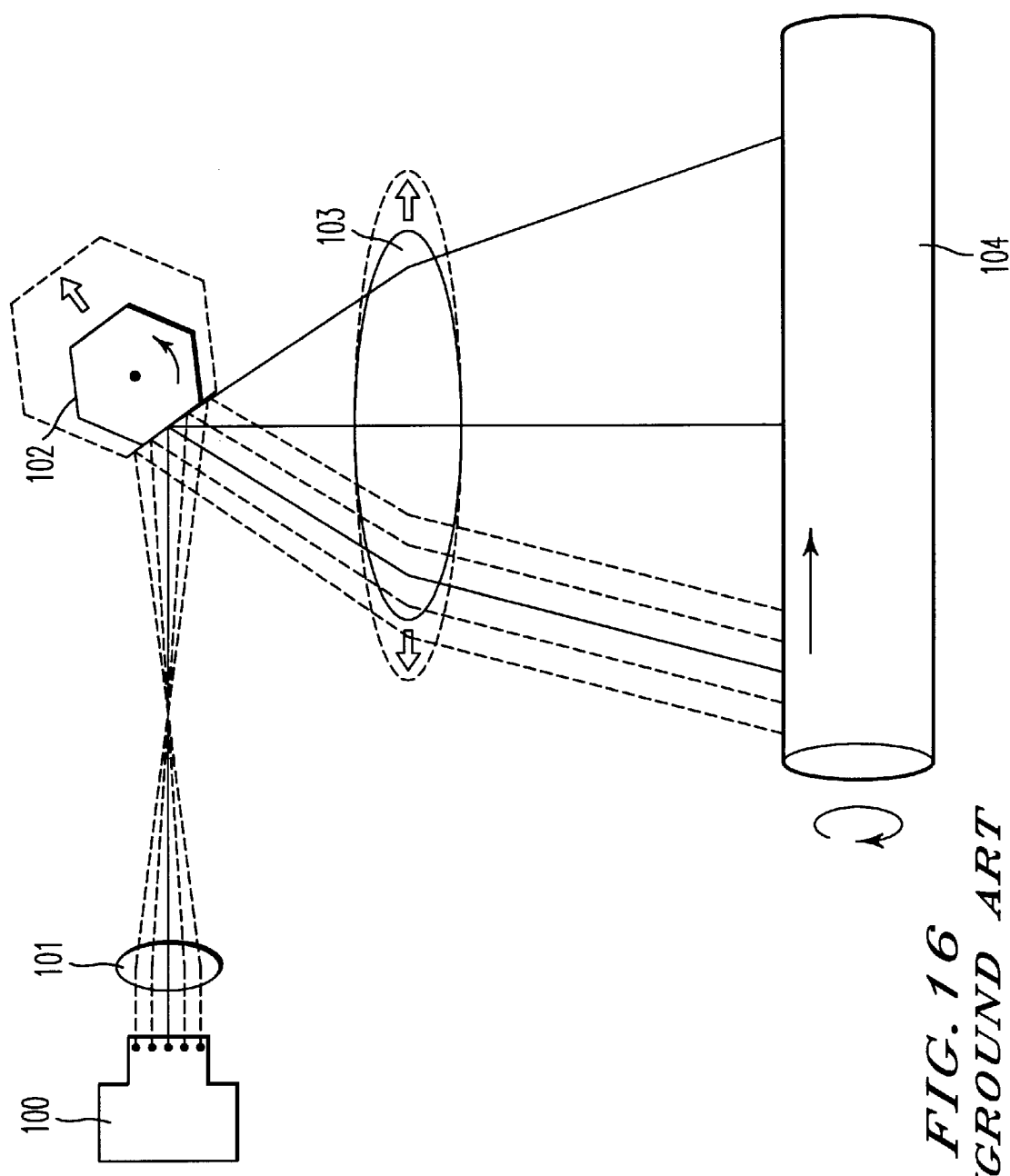
FIG. 16 is a plan view illustrating a background art apparatus.
Figure 17:
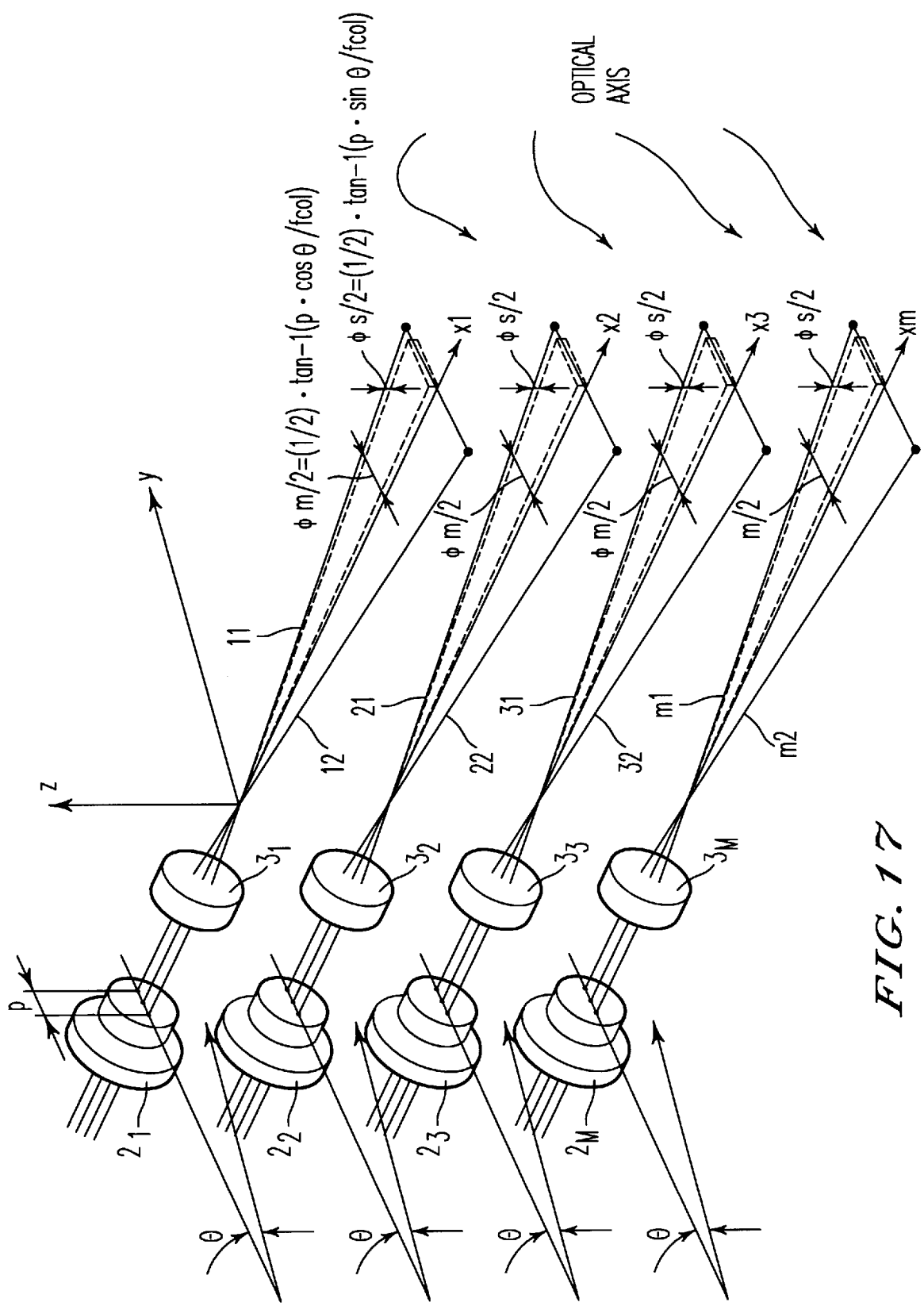
FIG. 17 is a perspective view explaining troublesome matters occurring at a time of adjusting an angle of 2n lines of beam.

A second embodiment of the present invention is now described referring to FIG. 15. This is an example of a structure of a light source unit 51 in a case that m is equal to 2 as shown in FIG. 10 through FIG. 14. At first, the collimator lenses $3_1$ and $3_2$ are arranged in a row on the same optical apparatus base body 52 in a state of making respective optical axes in the up-and-down direction of the paper surface of FIG. 15 parallel.

The semiconductor laser arrays 21 and 22 respectively having the n light-emitting points are arranged on the optical apparatus base body 52 through intermediation of corresponding supporting bodies $23_1$ and $23_2$ such that respective light-emitting points arrangement directions y' become equal to the paper surface front-and-rear direction, that is, the direction perpendicular to the surface of FIG. 15.

One of the semiconductor laser arrays, that is, the array $2_1$, is positioned such that the light-emitting point thereof is located almost on the optical axis of the collimator lens $3_1$ and is disposed on the optical apparatus base body 52. On the other hand, another semiconductor laser array $2_2$ can be finely adjusted on the surface perpendicular to the optical axis of the collimator lens $3_2$. Owing to the possibility of such a fine adjustment, the shifting of the light-emitting point position of the semiconductor laser array $2_2$ from the optical axis can be adjusted finely, and thereby the predetermined angle $\theta B$ to be formed between the beams can be given in the direction perpendicular to the paper surface of FIG. 15 between all of the composed 2n lines of light beams.

Furthermore, a supporting body 53 is provided at the right side of the optical apparatus base body 52. The supporting body 53 fixedly holds the beam composing prism 4, the half-wavelength plate 6, and the quarter-wavelength plate 7 as shown in FIG. 15, and the body 53 is finally fixed to the right side of the optical apparatus base body 52. Consequently, the n lines of light beams emitted from the semiconductor laser array $2_1$ are respectively converted to parallel light fluxes by use of the collimator lens $3_1$. The polarizing direction of the n light beams is rotated by 90°. The n light beams are transmitted through the polarized beam splitter surface $5_1$, converted to circular polarized light beams by use of the quarter-wavelength plate 7, and emitted as parallel light flux.

On the other hand, the n lines of light beams emitted from the semiconductor laser array $2_2$ are converted to parallel light flux by use of the collimator lens $3_2$, and are reflected in order to the reflection surface $5_2$ and to the polarized beam splitter surface $5_1$. Thereafter, the light beams are converted to circular-polarized beams, and are emitted as a parallel light flux.

In the structure of the light source unit 51 according to the present embodiment, since the respective m couples (in the present invention, m=2) of semiconductor laser array and collimator lens are adjacently arranged in a row on the same optical apparatus base body 52, even though there occurs a phenomenon of expansion/contraction thereof due to mechanical outer disturbance such as vibration, etc. and temperature variation of the optical apparatus base body 52, the relative variation of the direction of emitting the respective light beams may occur rarely. Consequently, time-elapsing stability can be realized for a multiple beam scanning apparatus, and thereby the distance between scanning lines can be constant with high reliability.

As is apparent from the foregoing description of the present invention, it is possible to find numerous advantageous and functional effects overcoming drawbacks in the background arts.

According to a first feature of the present invention, since m pieces of semiconductor laser arrays respectively having n light-emitting points are employed in an embodiment, it is possible to realize n-times capacity for multiple beams without increasing a size of a light source, compared with a background art system for composing the light beam. Furthermore, it is possible to realize m-times capacity for multiple beams, compared with a background art semiconductor laser array system. In addition, it is possible to realize a multiple beam system on further advantageous conditions.

According to a second feature of the present invention, the light source unit in the multiple beam scanning apparatus of the first feature is constructed with an optical apparatus equivalent to an apparatus utilizing one piece of a semiconductor laser array having substantially mn light-emitting points. Thereby, by disposing the entire light source to incline a predetermined angle from the main scanning direction, the mn lines of light beam can be arranged on the surface to be scanned at a predetermined equal scanning lines distance. Consequently, adjustment of rotation per each of the semiconductor laser array turns out to be unnecessary. Thereby, works of adjustment can be simplified, and in addition, if the optical apparatus is substantially unitarily constructed, time-elapsing stability can be obtained, in other words, any variation of the scanning lines distance can be suppressed.

In the multiple beams scanning apparatus of a second invention mode, a third feature of the present invention is that, assuming that "p" represents the distance between the light-emitting points of the semiconductor laser arrays, "fcol" the focal distance of the collimator lens, "fs" the focal distance of the focusing optical system in the subscanning direction, and "Ps the desired distance between the scanning lines on the surface to be scanned, the angles $\theta B$ and $\theta R$ are established so as to satisfy the following two equations:

$$\theta B \cdot \sin \theta R = \tan^{-1}(Ps/fs),$$

$$\theta B = \tan^{-1}(p/fcol).$$

The respective semiconductor laser arrays respectively successive n lines of scanning lines. The number of the arrays is m, and thereby those arrays can form mn lines of scanning lines. Therefore, even though there occurs a relative positional variation between the semiconductor arrays or between the collimator lenses, it is possible to enable the distance between successive n lines of scanning to have a property of slight variation.

In the multiple beam scanning apparatus of the second invention mode, a fourth feature of the present invention is that, assuming that "p" represents the distance between the light-emitting points of the semiconductor laser arrays, "fcol" the focal distance of the collimator lens, "fs" the focal distance of the focusing optical system in the subscanning direction, and "Ps the desired distance between the scanning lines on the surface to be scanned, the angles $\theta B$ and $\theta R$ are established so as to satisfy the following two equations:

$$\theta B \cdot \sin \theta R = \tan^{-1}(Ps/fs),$$

$$\theta B = \tan^{-1}\{p/(m \cdot fcol)\}.$$

The light beams from the respective semiconductor laser arrays respectively form the scanning lines every (m−1) lines, and the distance gap between the scanning lines is formed such that the scanning lines are arranged to fill up other light beams emitted from other semiconductor laser arrays. Consequently, the overall expansion of the light beam in the main scanning direction can be reduced to almost 1/m, in other words, to one piece of semiconductor laser array, and thereby the employed optical elements can be made as small-sized as possible.

According to a fifth feature of the present invention, in the multiple scanning apparatus of the second invention mode, there occurs very rarely any time-elapsing relative positional shift between the respective laser arrays, and thereby the distance between the scanning lines can be kept stably.

According to a sixth feature of the present invention, in the multiple beam scanning apparatus of the second invention mode, the distance between the scanning lines can be almost successively changed, and an almost linear relationship can be kept between the rotative angle and the scanning lines distance. Consequently, it is possible to adjust the distance between the scanning lines precisely and stably. At the same time, even if time-elapsing variation of the scanning lines distance occurs, correction on such an occasion can be made easily. Furthermore, automatization of the adjustment and correction can be made possible by performing rotative driving of the optical apparatus by use of an actuator, etc. In addition, it is also possible to change over the scanning lines density, by intentionally rotating the optical apparatus by a predetermined amount (angle) by use of the actuator.

According to a seventh feature of the present invention, in the multiple beam scanning apparatus of the first, second, third, fourth, fifth or sixth invention feature, the value of m is equal to 2 (m=2). Namely, if the number of the employed semiconductor laser arrays is two, it is possible to realize the multiple beam scanning apparatus by use of four or more multiple beam. In addition, the light beams can also be composed in a state of small loss utilizing the polarization property of the light beam emitted from the semiconductor laser array.

According to an eighth feature of the present invention, since the embodiment apparatus has a structure equivalent to that in a case of using one piece of semiconductor laser array substantially having mn light-emitting points, the mn lines of light beam can be arranged at a desired scanning lines distance on the surface to be scanned in the case of utilizing the multiple beam scanning apparatus, by inclining the entire portion of the multiple beam scanning apparatus by a predetermined angle from the main scanning direction.

Consequently, the rotative adjustment per each of the semiconductor laser arrays may become unnecessary, and thereby the works of adjustment can be simplified. In addition, if the apparatus is substantially unitarily constructed, the time-elapsing stability can be improved, namely, the variation of the scanning lines distance can be suppressed.

Obviously, numerous additional modifications or variations of the present invention are possible in light of the above teaching. It is therefore to be understood that, within the scope of the appended claims, the present invention may be practiced otherwise than as specifically described herein.

Having now fully described the invention, it will be apparent to one of ordinary skill in the art that many changes and modifications can be made without departing from the spirit and scope of the invention as set forth herein.

This application is based on Japanese Patent Application No. JPAP09-244,903, filed on Sep. 10, 1997, the entire contents of which are herein incorporated by reference.

What is claimed is:

1. A multiple beam scanning apparatus comprising:
    a light source unit including:
        m pieces of a semiconductor laser array respectively having n light-emitting points,
        m pieces of a collimator lens for respectively converting n lines of light beams emitted from respective of said semiconductor laser arrays to respective substantially parallel light beams, and
        a beam composing medium for composing mn lines of light beams respectively converted to said parallel light beams, wherein m is equal to or larger than two (m≧2), and n is equal to or larger than two (n≧2);
    a deflection optical system for focusing said mn light beams emitted from said light source unit onto a surface of a scanned object as a light spot.

2. The multiple beam scanning apparatus as defined in claim 1,
    wherein, in said light source unit, said m pieces of semiconductor laser array are arranged such that arrangement directions of light-emitting of said semiconductor laser array are parallel to each other,
    wherein, by setting all angles between said mn lines of said light beams emitted from said beam composing medium to a predetermined between-light-beams angle θB in said arrangement direction of the light-emitting points, and by setting all angles therebetween to substantially zero in a direction perpendicular to said arrangement direction of the light-emitting points of said semiconductor laser array, in said light source unit, said semiconductor laser arrays, said collimator lenses, and said beam composing medium are substantially combined into one combined unit, and
    wherein said multiple beam scanning apparatus further includes an inclination adjusting medium for rotatively moving and adjusting said combined unit to incline the arrangement direction of the light-emitting points of said semiconductor laser array by a predetermined angle θR from a scanning direction.

3. The multiple beam scanning apparatus as defined in claim 2,
    wherein "p" represents a distance between the light-emitting points of said semiconductor laser array, "fcol" a focal distance of said collimator lens, "fs" a focal distance of said focusing optical system in a subscanning direction, and "Ps a desired distance between the scanning lines on the surface to be scanned, angles θB and θR are established so as to satisfy the following equations:

$$\theta B \cdot \sin \theta R = \tan^{-1}(Ps/fs),$$

$$\theta B = \tan^{-1}(p/fcol).$$

4. The multiple beam scanning apparatus as defined in claim 2,
    wherein "p" represents a distance between light-emitting points of said semiconductor laser array, "fcol" a focal distance of said collimator lens, "fs" a focal distance of said focusing optical system in a subscanning direction, and "Ps" a desired distance between scanning lines on the surface to be scanned, the angles θB and θR are established so as to satisfy the following two equations:

$$\theta B \cdot \sin \theta R = \tan^{-1}(Ps/fs)$$

$$\theta B = \tan^{-1}\{(p/(m \cdot fcol)\}.$$

5. The multiple beam scanning apparatus as defined in claim 2,
    wherein m pieces of said collimator lens respectively have optical axes mutually parallel to each other, and said collimator lenses are respectively arranged adjacent to each other in a same optical device,
    wherein said m pieces of said semiconductor laser array are mounted on said optical device by intermediation of supporting bodies for respective of said semiconductor laser arrays, and wherein a predetermined between-light-beams angle θB is established between all of mn lines of respective light beams in accordance with a positional relationship between a light-emitting point position of said respective semiconductor laser arrays and a corresponding optical axes of said collimator lenses.

6. The multiple beam scanning apparatus as defined in claim 2,
wherein said inclination adjusting medium rotatively moves said combined unit around a standard optical axis of a light beam emitted from said light source unit as a rotation axis, and thereby said inclination adjusting medium adjusts the arrangement direction of the light-emitting points to incline the direction by a predetermined inclination angle θR from the scanning direction.

7. The multiple beam scanning apparatus as defined in claim 1, wherein the number m of said semiconductor laser arrays is equal to two (m=2).

8. The multiple beam scanning apparatus as defined in claim 2, wherein the number m of said semiconductor laser arrays is equal to two (m=2).

9. The multiple beam scanning apparatus as defined in claim 3, wherein the number m of said semiconductor laser arrays is equal to two (m=2).

10. The multiple beam scanning apparatus as defined in claim 4, wherein the number m of said semiconductor laser arrays is equal to two (m=2).

11. The multiple beam scanning apparatus as defined in claim 5, wherein the number m of said semiconductor laser arrays is equal to two (m=2).

12. The multiple beam scanning apparatus as defined in claim 6, wherein the number m of said semiconductor laser arrays is equal to two (m=2).

13. A light source unit for use in a multiple beam scanning apparatus comprising:
m pieces of a semiconductor laser array respectively having n light-emitting points;
m pieces of a collimator lens for respectively converting n lines of light beams emitted from said respective semiconductor laser arrays to respective substantially parallel light beams, and
a beam composing medium for composing mn lines of light beams respectively converted to said parallel light beams;
wherein m is equal to or larger than two (m≧2), and n is equal to or larger than two (n≧2),
wherein, in said light source unit, said m pieces of semiconductor laser array are arranged such that arrangement directions of the light-emitting points of said semiconductor laser array are parallel to each other,
wherein, by setting all angles between said mn lines of said light beams emitted from said beam composing medium to a predetermined between-light-beams angle θB in said arrangement direction of the light-emitting points, and by setting all angles therebetween to substantially zero in a direction perpendicular to said arrangement direction of the light-emitting points of said semiconductor laser array, in said light source unit, said semiconductor laser array, said collimator lens, and said beam composing medium are substantially combined into one combined unit.

14. The light source unit as defined in claim 13, wherein the number m of said semiconductor laser arrays is equal to two (m=2).

15. A multiple beam scanning apparatus comprising:
light source means for said multiple beam scanning apparatus including:
m pieces of semiconductor laser array means respectively having n light-emitting points,
m pieces of collimator means for respectively converting n lines of light beams emitted from said respective semiconductor laser arrays to respective substantially parallel light beams, and
beam composing means for composing mn lines of light beams respectively converted to said parallel light beams;
wherein m is equal to or larger than two (m≧2), and n is equal to or larger than two (n≧2);
deflection means for deflecting and scanning said mn light beams emitted from said light source means; and
focusing optical means for focusing said mn light beams emitted from said light source means onto a surface of a scanned object as a light spot through said deflection means.

16. The multiple beam scanning apparatus as defined in claim 15,
wherein, in said light source means, said m pieces of semiconductor laser array means are arranged such that arrangement directions of the light-emitting points of said semiconductor laser array means are parallel to each other,
wherein, by setting all angles between said mn lines of said light beams emitted from said beam composing means to a predetermined between-light-beams angle θB in said arrangement direction of the light-emitting point thereof, and by setting all angles therebetween to substantially zero in a direction perpendicular to said arrangement direction of the light-emitting points of said semiconductor laser array means, in said light source means, said semiconductor laser arrays means, said collimator means, and said beam composing means are substantially combined into one combined unit, and
wherein said multiple beam scanning apparatus further includes inclination adjusting means for rotatively moving and adjusting said combined unit to incline the arrangement direction of the light-emitting points of said semiconductor laser array means by a predetermined angle θR from a scanning direction.

17. The multiple beam scanning apparatus as defined in claim 16,
wherein, "p" represents a distance between the light-emitting points of said semiconductor laser array means, "fcol" a focal distance of said collimator means, "fs" a focal distance of said focusing optical means in a subscanning direction, and "Ps" a desired distance between scanning lines on the surface to be scanned, angles θB and θR are established so as to satisfy the following equations:

$$\theta B \cdot \sin \theta R = \tan^{-1}(Ps/fs)$$

$$\theta B = \tan^{-1}(p/fcol).$$

18. The multiple beam scanning apparatus as defined in claim 16,
wherein, "p" represents a distance between the light-emitting points of said semiconductor laser array means, "fcol" a focal distance of said collimator means lens, "fs" a focal distance of said focusing optical means in a subscanning direction, and "Ps" a desired distance between scanning lines on the surface to be scanned, angles θB and θR are established so as to satisfy the following equations:

$$\theta B \cdot \sin \theta R = \tan^{-1}(Ps/fs)$$

$$\theta B = \tan^{-1}\{(p/(m \cdot fcol)\}.$$

19. The multiple beam scanning apparatus as defined in claim 16,
wherein m pieces of said collimator means respectively have optical axes mutually parallel to each other, and said collimator lens means are respectively arranged adjacent to each other in a same optical device,
wherein m pieces of said semiconductor laser array means are mounted on said same optical device by intermediation of supporting bodies for respective of said semiconductor laser array means, and
wherein a predetermined between-light-beams angle θB is established between all of mn lines of respective light beams in accordance with a positional relationship between a light-emitting point position of said respective semiconductor laser array means and a corresponding optical axes of said collimator lens means.

20. The multiple beam scanning apparatus as defined in claim 16,
wherein said inclination adjusting means rotatively moves said combined unit around a standard optical axis of a light beam emitted from said light source means as a rotation axis, and thereby said inclination adjusting means adjusts the arrangement direction of the light-emitting point so as to incline the direction by a predetermined inclination angle θR from the main scanning direction.

21. Light source means for use in a multiple beam scanning apparatus comprising:
m pieces of semiconductor laser array means respectively having n light-emitting points;
m pieces of collimator means for respectively converting n lines of light beams emitted from said respective semiconductor laser array means to respective substantially parallel light beams; and
beam composing means for composing mn lines of light beams respectively converted to said parallel light beams;
wherein m is equal to or larger than two (m≧2), and n is equal to or larger than two (n≧2),
wherein, in said light source means, said m pieces of semiconductor laser array means are arranged such that arrangement directions of the light-emitting points of said semiconductor laser array means are parallel to each other,
wherein, by setting all angles between said mn lines of said light beams emitted from said beam composing means to a predetermined between-light-beams angle θB in said arrangement direction of the light-emitting point thereof, and by setting all angles therebetween to substantially zero in a direction perpendicular to said arrangement direction of the light-emitting point of said semiconductor laser array means, in said light source unit, said semiconductor laser array means, said collimator means, and said beam composing means are substantially combined into one combined unit, and
wherein said multiple beam scanning apparatus further includes inclination adjusting means for rotatively moving and adjusting said combined unit to incline the arrangement direction of the light-emitting points of said semiconductor laser array means by a predetermined angle θR from a scanning direction.

22. The light source means as defined in claim 21, wherein the number m of said semiconductor laser arrays is equal to two (m=2).

23. A method of multiple beam scanning comprising the steps of:
preparing a light source including m pieces of semiconductor laser array having n light-emitting points, m pieces of a collimator lens for converting n lines of light beams emitted from said semiconductor laser arrays to parallel light beams, and a beam composing medium for composing mn lines of light beams;
deflecting and scanning said mn light beams emitted from said light source unit; and
focusing said mn light beams emitted from said light source unit onto a surface of a scanned object as a light spot.

24. The method of multiple beam scanning as defined in claim 23, further comprising the steps of:
arranging said m pieces of semiconductor array in said light source such that arrangement directions of the light-emitting points of said semiconductor array are parallel to each other;
setting all angles between said mn lines of said light beam emitted from said beam composing medium to a predetermined between-light-beams angle θB in said arrangement direction of the light-emitting points thereof,
setting all angles therebetween to substantially zero in a direction perpendicular to said arrangement direction of the light-emitting points of said semiconductor laser array, in said light source unit;
unitarily combining said semiconductor laser array, said collimator lens, and said beam composing medium into a combined unit; and
rotatively moving and adjusting said combined unit to incline the arrangement direction of a light-emitting points of said semiconductor laser array by a predetermined angle θ from a scanning direction.

25. The method of multiple beam scanning as defined in claim 24, further comprising the step of:
establishing angles θB and θR so as to satisfy the following equations in which "p" represents a distance between the light-emitting points of said semiconductor laser arrays, "fcol" a focal distance of said collimator lens, "fs" a focal distance of said focusing optical system in a subscanning direction, and "Ps a desired distance between the scanning lines on the surface to be scanned:

$$\theta B \cdot \sin \theta R = \tan^{-1}(Ps/fs),$$

$$\theta B = \tan^{-1}(p/fcol).$$

26. The method of multiple beam scanning as defined in claim 24, further comprising the step of:
establishing angles θB and sin θR so as to satisfy the following equations in which "p" represents a distance between light-emitting points of said semiconductor laser arrays, "fcol" a focal distance of said collimator lens, "fs" a focal distance of said focusing optical system in a subscanning direction, and "Ps" a desired distance between scanning lines on the surface to be scanned:

$\theta B \cdot \sin \theta R = \tan^{-1}(Ps/fs)$, $\theta B = \tan^{-1}\{(p/(m \cdot fcol)$.

27. The method of multiple beam scanning as defined in claim 24, further comprising the steps of:
 arranging said collimator lenses adjacent to each other in a same optical device;
 mounting m pieces of said semiconductor laser array on said same optical device; and
 establishing a predetermined between-light-beams angle θB between all of mn lines of respective light beams in accordance with a positional relationship between the light-emitting point position of said respective semiconductor laser arrays and corresponding optical axes of said collimator lenses.

28. The method of multiple beam scanning as defined in claim 24, further comprising the steps of:
 causing said inclination adjusting medium to rotatively move said combined unit around a standard optical axis of a light beam emitted from said light source unit as a rotation axis; and
 causing said inclination adjusting medium to adjust the arrangement direction of the light-emitting points to incline the direction by a predetermined inclination angle θR from the main scanning direction.

29. A method of multiple beam scanning employing a light source unit for use in a multiple beam scanning apparatus, comprising the steps of:
 preparing m pieces of a semiconductor laser array respectively having n light emitting points;
 preparing m pieces of a collimator lens for respectively converting n lines of light beams emitted from said respective semiconductor laser arrays to respective substantially parallel light beams;
 composing mn lines of light beams respectively converted to said parallel light beams by use of a beam composing medium;
 wherein m is equal to or larger than two (m≧2);
 arranging, in said light source unit, said m pieces of semiconductor laser array such that arrangement directions of the light-emitting points of said semiconductor laser array are parallel to each other;
 setting all angles between said mn lines of said light beams emitted from said beam composing medium to a predetermined between-light-beams angle θB in said arrangement direction of the light-emitting point;
 setting all angles therebetween to substantially zero in a direction perpendicular to said arrangement direction of the light-emitting points of said semiconductor laser array, in said light source unit, said semiconductor laser arrays, and said collimator lens;
 substantially combining said beam composing medium into one combined unit; and
 rotatively moving and adjusting said combined unit to incline the arrangement direction of the light-emitting points of said semiconductor laser array by a predetermined angle θR from a main scanning direction, by use of said multiple beam scanning apparatus.

* * * * *